United States Patent
Ishikawa

(10) Patent No.: US 9,749,538 B2
(45) Date of Patent: Aug. 29, 2017

(54) IMAGING APPARATUS

(71) Applicant: OLYMPUS CORPORATION, Hachioji-shi, Tokyo (JP)

(72) Inventor: Takashi Ishikawa, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/161,697

(22) Filed: May 23, 2016

(65) Prior Publication Data

US 2017/0006229 A1 Jan. 5, 2017

(30) Foreign Application Priority Data

Jun. 30, 2015 (JP) ................................. 2015-131917

(51) Int. Cl.
- H04N 5/232 (2006.01)
- H04N 5/225 (2006.01)
- H04N 5/349 (2011.01)

(52) U.S. Cl.
CPC ....... H04N 5/23287 (2013.01); H04N 5/2253 (2013.01); H04N 5/23232 (2013.01); H04N 5/349 (2013.01)

(58) Field of Classification Search
CPC ............... H04N 5/349; H04N 5/23287; H04N 5/23283; H04N 5/2328; H04N 5/23232; H04N 5/2253

See application file for complete search history.

(56) References Cited

U.S. PATENT DOCUMENTS

| | | | | |
|---|---|---|---|---|
| 2002/0163581 A1* | 11/2002 | Kitazawa | ........... | H04N 5/23248 348/208.6 |
| 2005/0195286 A1* | 9/2005 | Uenaka | ............. | H04N 5/23248 348/208.99 |
| 2005/0196160 A1* | 9/2005 | Uenaka | ............. | H04N 5/23258 396/55 |
| 2009/0003813 A1* | 1/2009 | Ohishi | ............... | H04N 5/23248 396/55 |
| 2015/0146024 A1* | 5/2015 | Takeuchi | ........... | H04N 5/23287 348/208.4 |
| 2015/0156418 A1* | 6/2015 | Moon | ................. | H04N 5/23258 348/208.11 |
| 2015/0301353 A1* | 10/2015 | Takeuchi | ........... | H04N 5/23287 359/554 |
| 2016/0073027 A1* | 3/2016 | Noguchi | ............ | H04N 5/23287 348/208.6 |

FOREIGN PATENT DOCUMENTS

JP 2009047756 A 3/2009

\* cited by examiner

*Primary Examiner* — Jason Flohre
(74) *Attorney, Agent, or Firm* — Holtz, Holtz & Volek PC

(57) ABSTRACT

An imaging apparatus includes an image stabilizing unit, a position signal processing unit, and a position signal processing control unit. The image stabilizing unit includes a movable portion, a motor, and a position detector. The position signal processing unit converts an analog signal output from the position detector into position information. The position signal processing control unit applies first settings or second settings to the position signal processing unit. The position signal processing control unit applies the second settings based on an output obtained when the position signal processing unit is applied with the first settings.

10 Claims, 21 Drawing Sheets

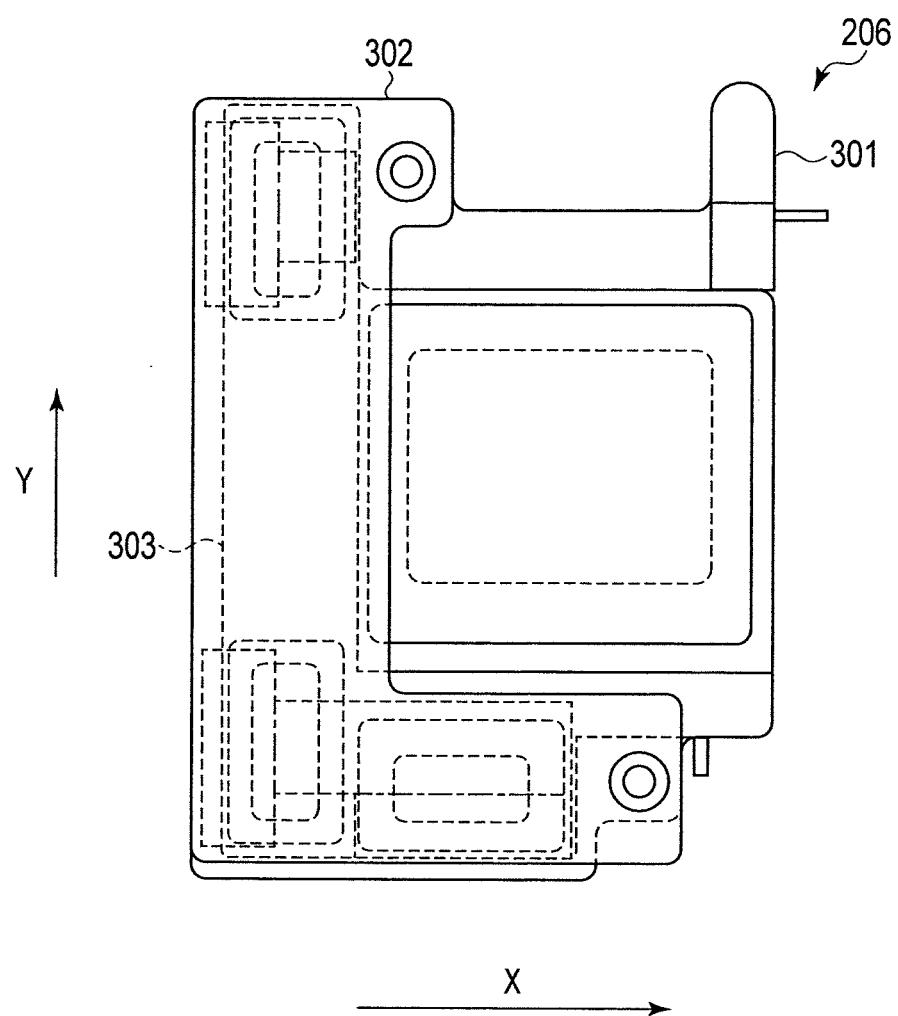
F I G. 2

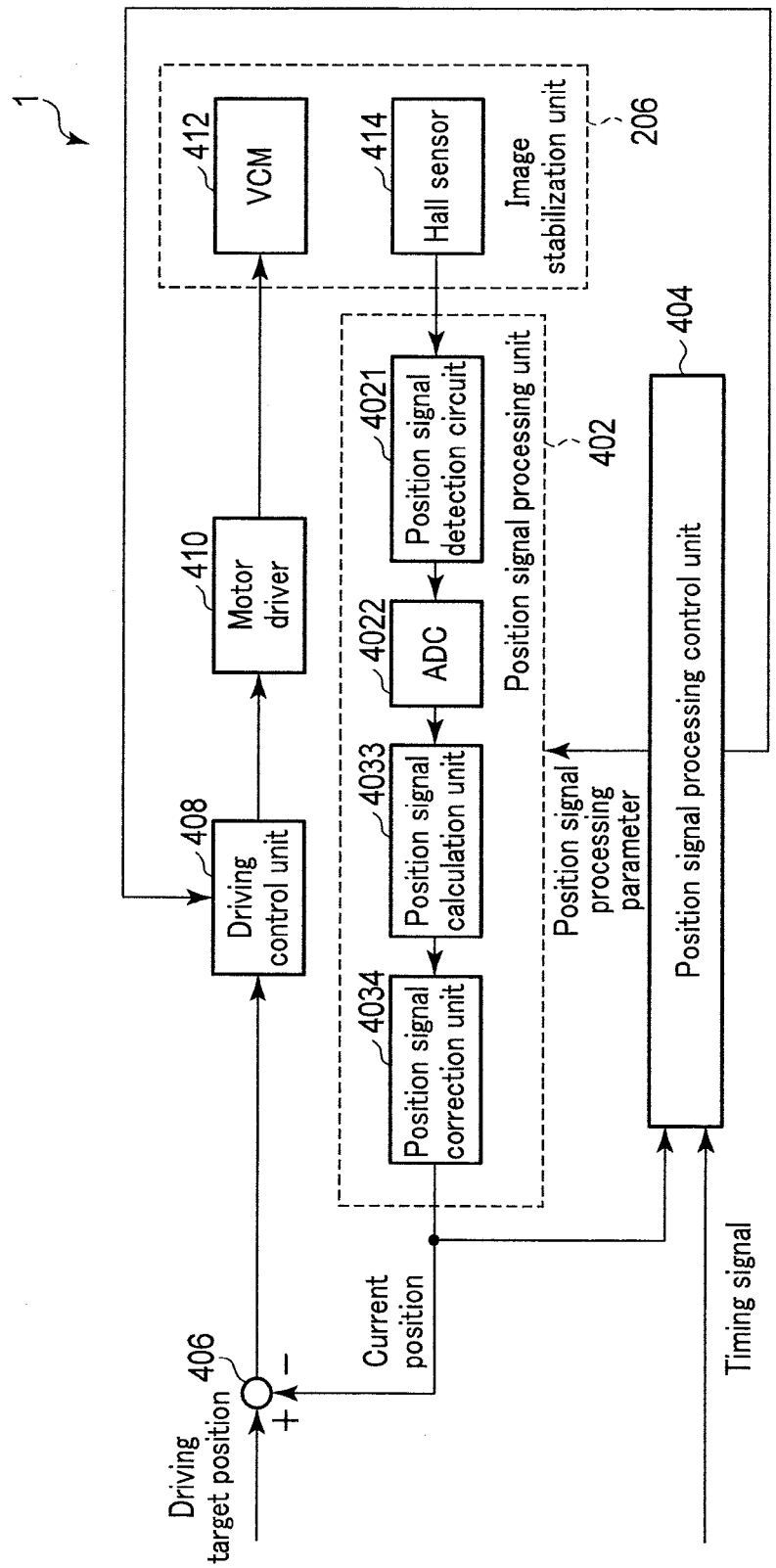
F I G. 5

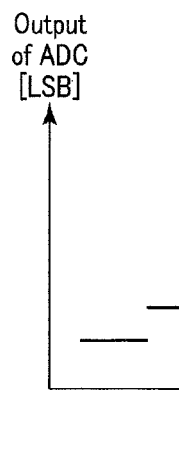
FIG. 8A
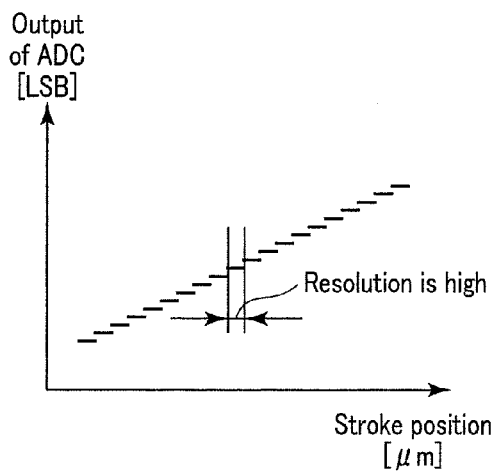
FIG. 8B
| | Range | | ADC | Position calculation unit (Position signal A × AD value + B) | |
|---|---|---|---|---|---|
| | | | Resolution | A(Constant) | B(Constant) |
| First settings | Whole range | −50~1050 μm | 0.29 μm/LSB | 2.9 | 4061 |
| Second settings | Range 1 | −50~350 μm | 0.10 μm/LSB | 1 | 4452 |
| | Range 2 | 300 μm~700 μm | | 1 | 7952 |
| | Range 3 | 650 μm~1050 μm | | 1 | 11452 |
FIG. 9

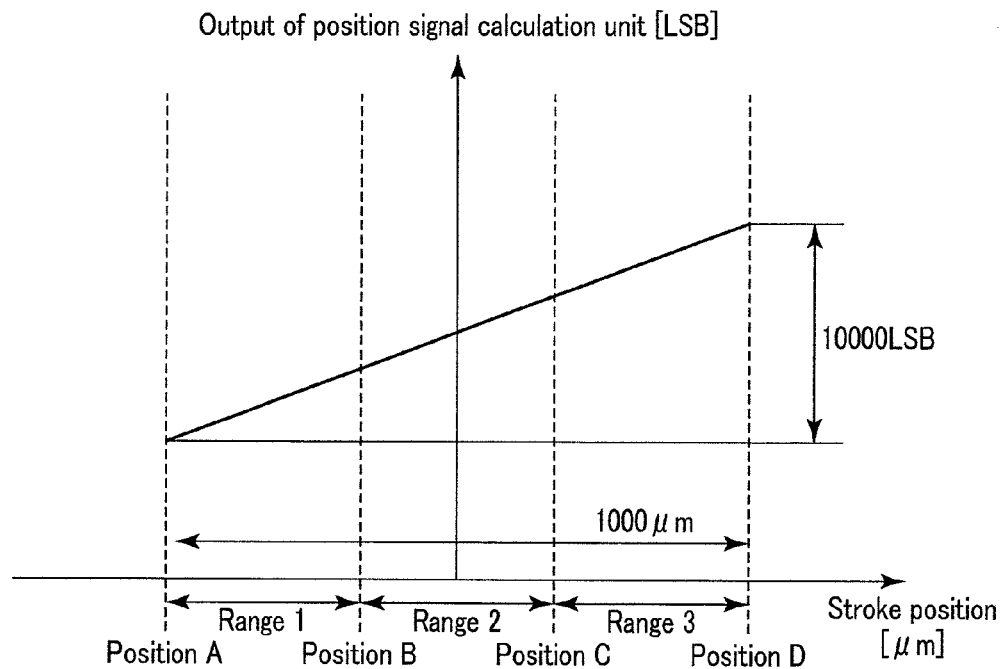
F I G. 11A
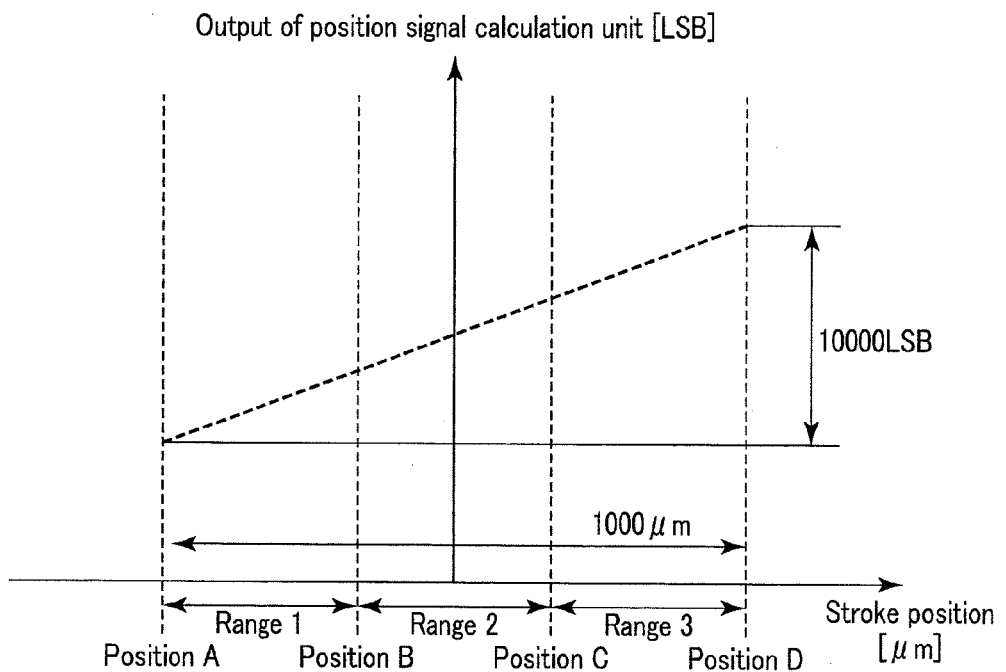
F I G. 11B

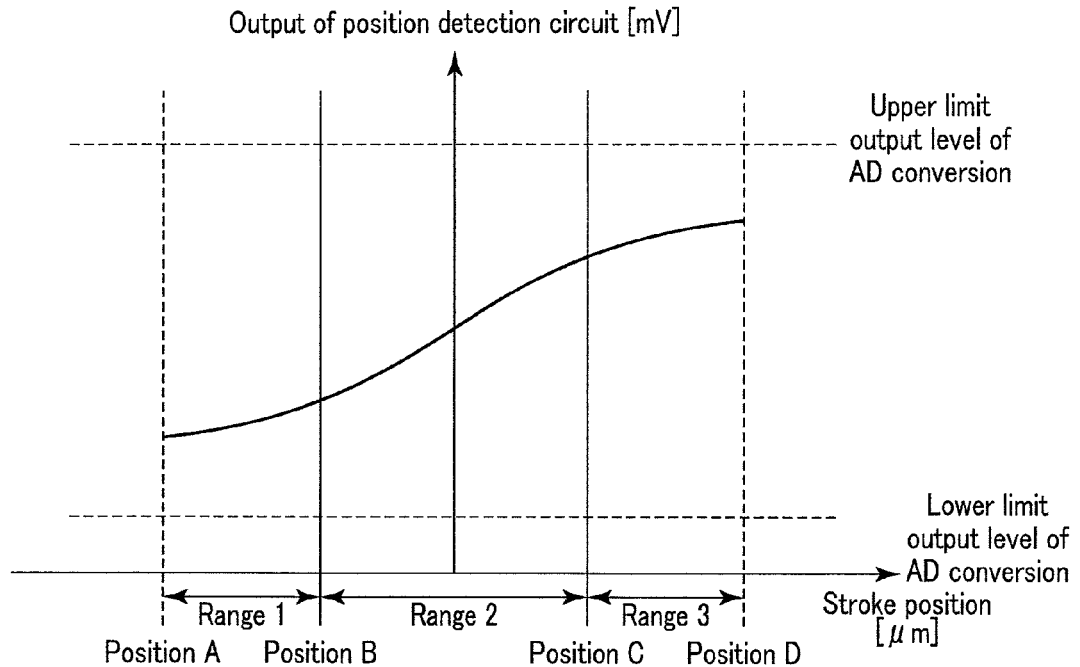
F I G. 18A
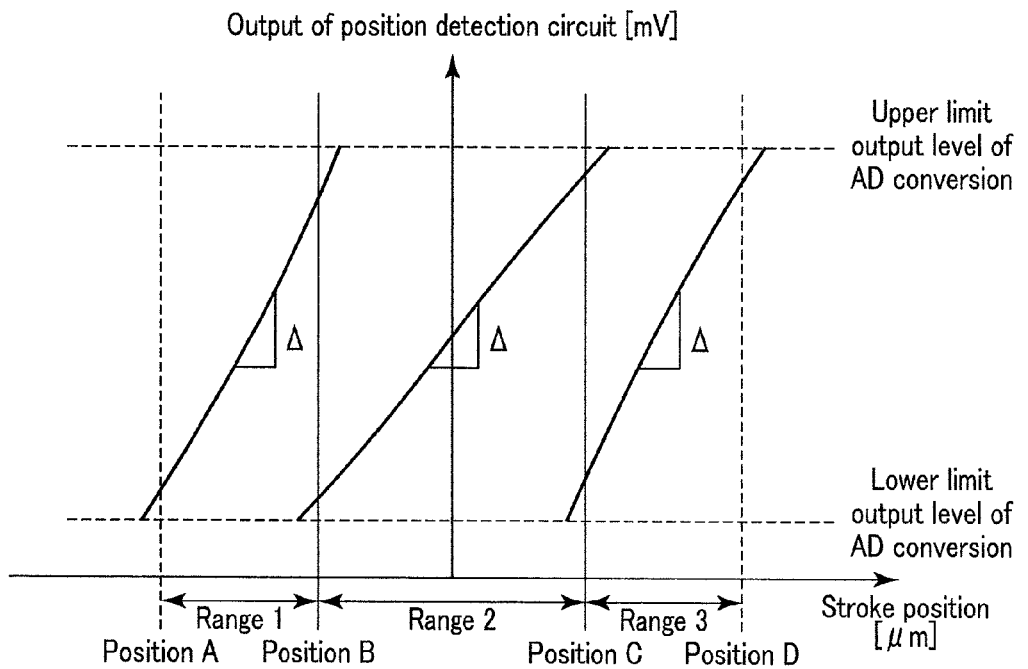
F I G. 18B

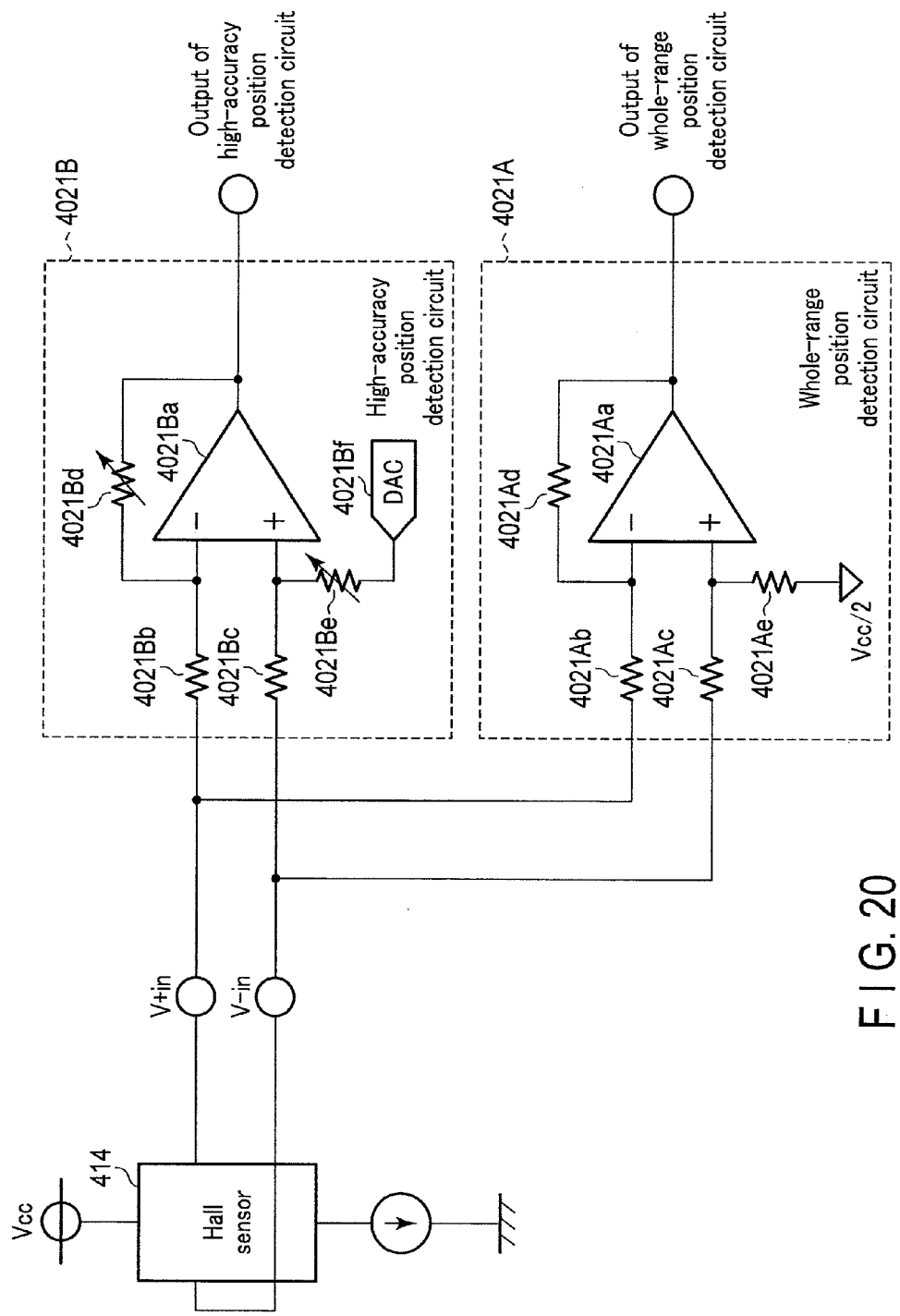
F I G. 20

IMAGING APPARATUS

CROSS-REFERENCE TO RELATED APPLICATIONS

This application is based upon and claims the benefit of priority from prior Japanese Patent Application No. 2015-131917, filed Jun. 30, 2015, the entire contents of which are incorporated herein by reference.

BACKGROUND OF THE INVENTION

1. Field of Invention

The present invention relates to an imaging apparatus provided with an image stabilization unit.

2. Description of the Related Art

In recent years, digital cameras and video cameras have come to use high-density-pixel imaging elements capable of capturing high-resolution images, and there is an increasing demand for improvement of the positioning accuracy of image stabilization units. Some of the existing cameras are provided with a pixel-shift super-high resolution photographing function. According to this function, a number of images are photographed while moving an imaging element with accuracy lower than that defined by the pixel pitch, and the resultant images are synthesized as an image having a resolution higher than that of the imaging element. The pixel-shift super-high resolution photographing function requires higher positioning accuracy than that of ordinary photography.

Jpn. Pat. Appln. KOKAI Publication No. 2009-47756 proposes improving the position detection accuracy by changing the amplification factor and offset of a position detection circuit connected to a Hall sensor. In other words, according to Jpn. Pat. Appln. KOKAI Publication No. 2009-47756, an analog signal output from the Hall sensor is amplified, before it is converted into a digital signal and supplied to the position detection circuit. As a result, the digital signal subjected to the AD conversion can represent a position with high resolution. Accordingly, the position detection accuracy is improved.

BRIEF SUMMARY OF THE INVENTION

According to a first aspect of the invention, there is provided an imaging apparatus comprising: an image stabilizing unit including (i) a movable portion provided with an imaging element or a photographing lens, (ii) a motor which drives the movable portion relative to a fixed portion, and (iii) a position detector which detects a position of the movable portion; a position signal processing unit which converts an analog signal output from the position detector into position information which is based on a movement amount of the movable portion; and a position signal processing control unit which applies first settings or second settings to the position signal processing unit, wherein the first settings enable the analog signal output from the position detector to be detected as a position in a whole movable range of the movable portion, and the second settings enable the analog signal output to be detected as a position in divided ranges obtained by dividing the whole movable range of the movable portion, wherein the position signal processing control unit applies the second settings based on an output obtained when the position signal processing unit is applied with the first settings.

According to a second aspect of the invention, there is provided an imaging apparatus comprising: an image stabilizing unit including (i) a movable portion provided with an imaging element or a photographing lens, (ii) a motor which drives the movable portion relative to a fixed portion, and (iii) a position detector which detects a position of the movable portion; a first position signal processing unit which converts an analog signal output from the position detector into position information which is based on a movement amount by which the movable portion moves in a whole movable range of the movable portion; a second position signal processing unit which changes an analog signal output from the position detector into position information which is obtained with respect to divided ranges obtained by dividing the whole movable range of the movable portion and which is more accurate than the position information provided by the first position signal processing unit; a position signal processing control unit which applies the second position signal processing unit with settings that enable the analog signal output from the position detector to be detected as a position in each of the divided ranges obtained by dividing the whole movable range of the movable portion; and a position signal processing selecting unit which selects either the first position signal processing unit or the second position signal processing unit, wherein the position signal processing control unit determines settings applied by the second position signal processing unit based on information provided by the first position signal processing unit.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 illustrates an assembled state of an image stabilization unit.

FIG. 5 is a functional block diagram illustrating an imaging apparatus according to the first embodiment.

FIG. 8A shows a result obtained when that output of the position detection circuit shown in FIG. 7A is subjected to AD conversion.

FIG. 8B shows a result obtained when that output of the position detection circuit shown in FIG. 7B is subjected to AD conversion.

FIG. 9 shows an example of how constants A and B are determined.

FIG. 11A and FIG. 11B show examples of outputs from a position signal operation circuit.

FIG. 18A and FIG. 18B illustrate how a range is divided when the position detection circuit has a nonlinear characteristic.

FIG. 20 illustrates the circuit configurations of an example of a whole-range position detection circuit and an example of a high-accuracy position detection circuit.

DETAILED DESCRIPTION OF THE INVENTION

Embodiments of the present invention will now be described with reference to the accompanying drawings.

First Embodiment

Figure 1:
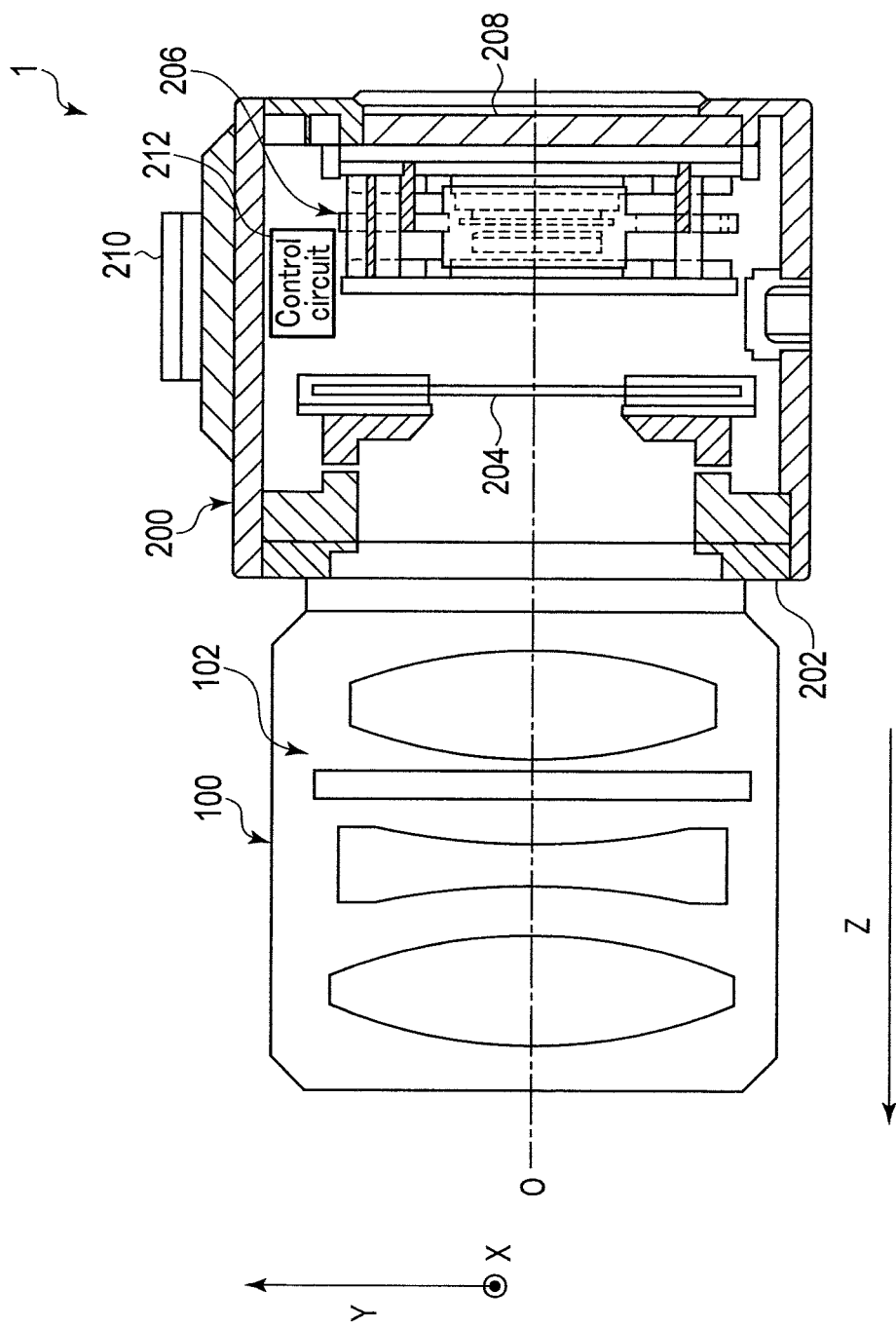
FIG. 1 schematically illustrates an imaging apparatus common to embodiments of the present invention.

The first embodiment will be explained below. FIG. 1 schematically illustrates an imaging apparatus common to embodiments of the present invention. The imaging apparatus 1 shown in FIG. 1 comprises an interchangeable lens 100 and a main body 200. The interchangeable lens 100 is attached to the main body 200 by means of a mount 202 of the main body 200. When attached to the main body 200, the interchangeable lens 100 and the main body 200 connected in such a manner as to enable communications with each other. As a result, the interchangeable lens 100 and the main body 200 operate in cooperation with each other. The imaging apparatus 1 is not necessarily a lens interchangeable type. For example, the imaging apparatus 1 may be a lens-integral type imaging apparatus.

The interchangeable lens 100 comprises an optical system 102. The optical system 102 includes, for example, a plurality of lenses and a diaphragm, and a light beam from an object (not shown) enters the image stabilization unit 206 of the main body 200. Although the optical system 102 shown in FIG. 1 includes a plurality of lenses, it may include a single lens. The optical system 102 may include a focusing lens; alternatively, it may be configured as a zoom lens. In these cases, at least some of the lenses of the optical system 102 are movable in the Z direction, which is parallel to the optical axis O.

The main body 200 comprises a shutter 204, an image stabilization unit 206, a monitor 208, an operation portion 210 and a control circuit 212.

The shutter 204 is, for example, a focal plane shutter arranged on the front side of the image stabilization unit 206 (which side will be referred to as a positive side in the Z direction). When the shutter 204 is open, the image stabilization unit 206 is set in the exposed state. When the shutter 204 is closed, the image stabilization unit 206 is set in the light-shielded state.

When an image of an object, not shown, is taken, the image stabilization unit 206 generates a photograph image relating to the object. When the movable portion is moved relative to the fixed portions by means of a voice coil motor (VCM) made up of a coil and a magnet, the image stabilization unit 206 corrects the image blurring caused by hand shaking. The structure of the image stabilization unit 206 will be described in detail later.

The monitor 208 is, for example, a liquid crystal display and displays an image based on the photograph image generated by the image stabilization unit 206. The monitor also displays a menu screen, which enables the user to enter various settings to the imaging apparatus 1. The monitor 208 may be provided with a touch panel.

The operation portion 210 is, for example, a release button. The release button is a button with which the user instructs the start of the photographing operation by the imaging apparatus 1. The operation portion 210 may include various operation elements other than the release button.

The control circuit 212 is made, for example, of an ASIC including a CPU and a memory, and controls the entire imaging apparatus 1, including a photographing operation of the imaging apparatus 1.

The structure of the image stabilization unit 206 will be described. FIG. 2 illustrates an assembled state of the image stabilization unit 206. As shown in FIG. 2, the image stabilization unit 206 includes two fixed portions 301 and 302 and a movable portion 303 sandwiched between the fixed portions 301 and 302. With this structure, the image stabilization unit 206 permits the movable portion 303 to move in a plane perpendicular to the optical axis O (namely, in the X and Y directions shown in FIG. 2). In addition, the image stabilization unit 206 permits the movable portion 303 to rotate around the optical axis O.

Figure 3:
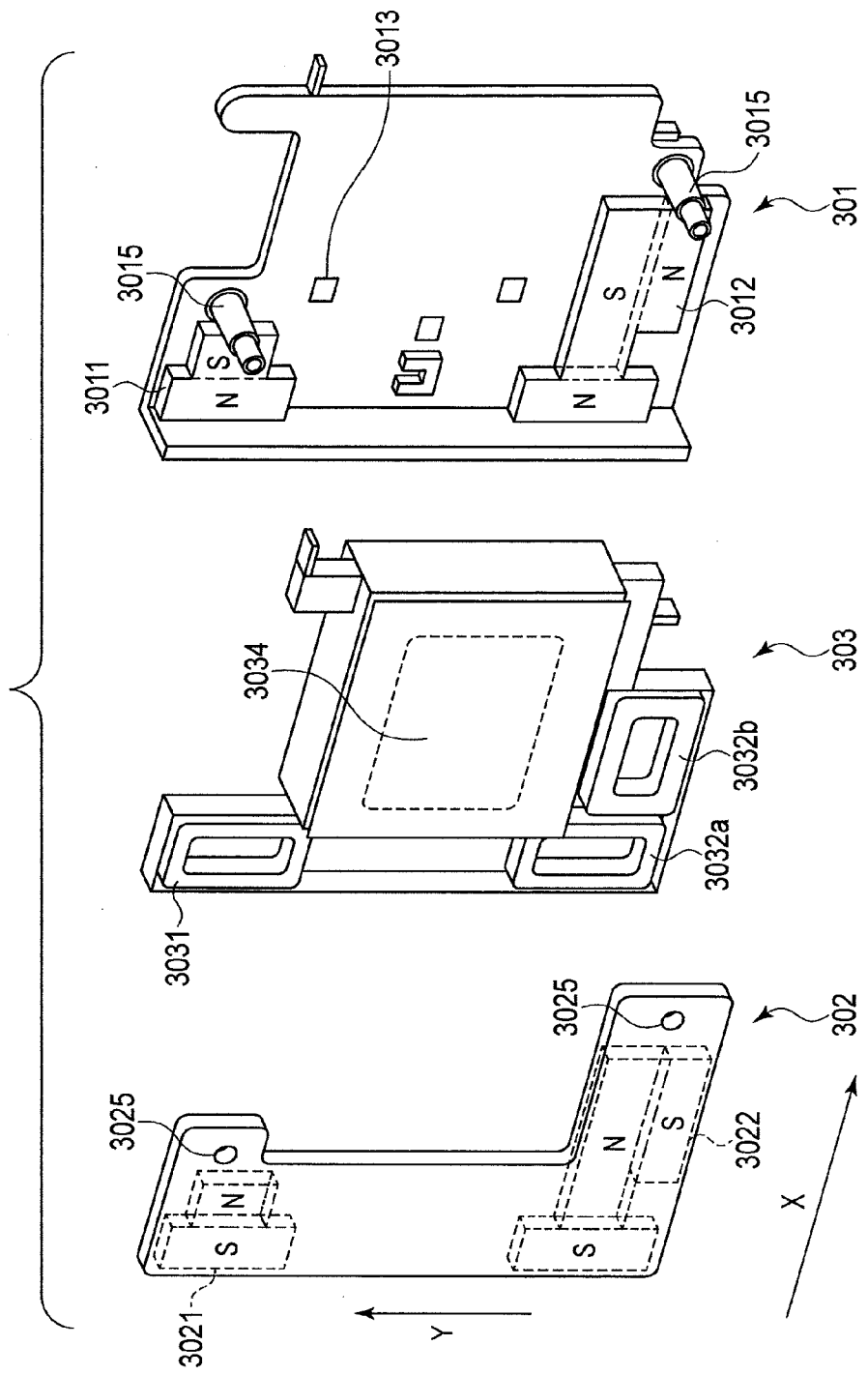
FIG. 3 is an exploded perspective view of the image stabilization unit.

First, a description will be given of the structure related to the movement of the movable portion 303 of the image stabilization unit 206. FIG. 3 is an exploded perspective view of the image stabilization unit 206. As shown in FIG. 3, the fixed portion 301 located on the monitor (208) side of the movable portion 303 is a substantially rectangular plate member and is secured to the main body 200. A magnet 3011 for movement in the X-direction and magnet 3012 for movement in both the X-direction and Y-direction are attached to the outer wall of the fixed portion 301.

The magnet 3011 includes a rectangular first magnet. The first magnet has its longer sides extending in the Y direction and comprises an N pole facing the movable portion 303. The magnet 3011 also includes a rectangular second magnet. The second magnet has its longer sides extending in the Y direction, but the longer sides of the second magnet are shorter than those of the first magnet. The second magnet comprises an S pole facing the movable portion 303. The second magnet of the fixed portion 301 is arranged adjacent to the center portion of the right side of the first magnet, as viewed from the movable portion 303. The magnet 3012 includes a rectangular first magnet. The first magnet has its longer sides extending in the Y direction and comprises an N pole facing the movable portion 303. The magnet 3012 also includes a rectangular second magnet. The second magnet has its longer sides extending in the X direction, and the shorter sides of the second magnet extending in the Y direction are shorter than the longer sides of the first magnet. The second magnet comprises an S pole facing the movable portion 303. The second magnet 301 is arranged adjacent to the center portion of the right side of the first magnet, as viewed from the movable portion 303.

The magnet 3012 further includes a rectangular third magnet. The third magnet has its longer sides extending in the X direction, but the longer sides of the third magnet are shorter than those of the second magnet. The third magnet comprises an N pole facing the movable portion 303. The third magnet 301 is arranged on the lower side of the second magnet, as viewed from the movable portion 303. As can be seen, the second magnet of the magnet 3012 serves as a magnet for movement in the X direction in combination with the first magnet, and also serves as a magnet for movement in the Y direction in combination with the third magnet.

The fixed portion 302 located on the shutter (204) side of the movable portion 303 is a substantially L-shaped plate member comprising an opening in which an imaging element unit 3034 is held. A magnet 3021 for movement in the X-direction and magnet 3022 for movement in both the X-direction and Y-direction are attached to the fixed portion 301 at positions corresponding to the magnets 3011 and 3012 of the fixed portion. Magnet 3021 has a structure similar to that of magnet 3011, and poles opposite to those of magnet 3011 face the movable portion 303. Magnet 3022 has a structure similar to that of magnet 3012, and poles opposite to those of magnet 3012 face the movable portion 303.

The movable portion 303 is a substantially L-shaped plate member comprising an opening (similar to that of the fixed portion 302) in which an imaging element unit 3034 is held. Coils 3031 and 3032a for movement in the X direction and coil 3032b for movement in the Y direction are arranged on the outer wall of the movable portion 303. Coil 3031 is provided on the plate portion extending in the Y direction and located at the position corresponding to magnets 3011 and 3021. Coil 3032a is provided on the plate portion extending in the Y direction and located at the position corresponding to the first and second magnets of magnets 3012 and 3022. Coil 3032b is provided on the plate portion extending in the X direction and located at the position corresponding to the second and third magnets of magnets 3012 and 3022.

The imaging element unit 3034 is held in the opening of the movable portion 303. The imaging element unit 3034 is a unit including an imaging element and a control circuit for controlling the imaging element. The imaging element unit 3034 of the present embodiment comprises an imaging element, a signal processor, an A/D conversion unit and an image processing unit. The imaging element captures an image of an object and generates a photographing image signal relating to the object. The signal processing unit performs analog processing for the photographing image signal, such as amplifying processing. The A/D converter converts the photographing image signal processed by the signal processing unit into a digital signal. The image processing unit performs image processing for the photographing image signal and generates a photographed image. In addition, the image processing unit synthesizes a number of photographed images and generates a super-high resolution image.

Fixed portion 301 is provided with two screw receivers 3015, and fixed portion 302 is provided with screw-receiver holes 3025 at positions corresponding to the screw receivers 3015. Fixed portion 302 is secured by means of screws in such a manner that the movable portion 303 is held between fixed portions 301 and 302. It should be noted that coils 3031, 3032a and 3032b are not in contact with magnets 3011, 3012, 3021 and 3022; there is a predetermined gap between the coils and the magnets.

With this structure, when a current supplied to one of the coils 3031, 3032a and 3032b, the movable portion 303 is set in the floating state between the fixed portions 301 and 302. The movable portion 303 is moved in parallel or rotated by controlling the driving currents supplied to the coils 3031, 3032a and 3032b.

Figure 4:
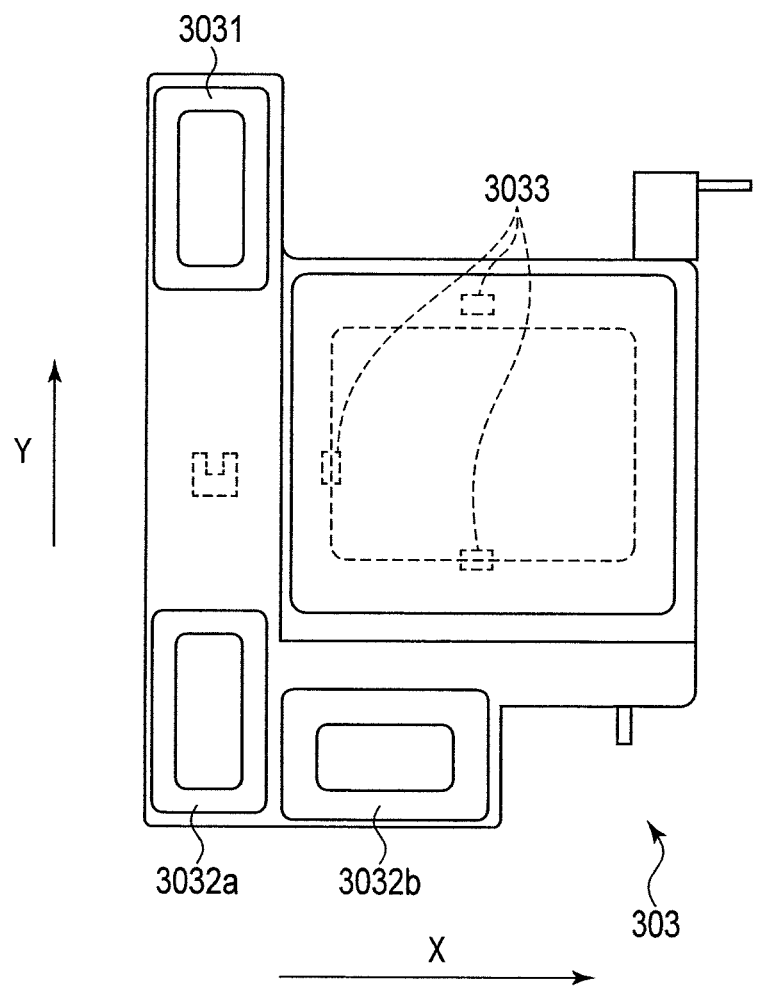
FIG. 4 illustrates how a Hall sensor is arranged in a movable portion.

A description will now be given of a structure related to the position detection performed by the movable portion 303. Three position detection magnets 3013 are provided on fixed portion 301. One of the position detection magnets 3013 is located on the upper portion of fixed portion 301. Another one of the position detection magnets 3013 is located on the lower portion of fixed portion 301. The remaining one of the position detection magnets 3013 is located on the left portion of fixed portion 301. As shown in FIG. 4, three Hall sensors 3033 are provided on the reverse surface of the movable portion and located at positions corresponding to the position detection magnets. By a pair made up of the position detection magnet 3013 located in the upper portion of fixed portion 301 and the Hall sensor 3033 located in the upper portion of the movable portion 303, a first displacement of the movable portion 303 in the X direction is detected as a change in the magnetic field. By a pair made up of the position detection magnet 3013 located in the lower portion of fixed portion 301 and the Hall sensor 3033 located in the lower portion of the movable portion 303, a second displacement of the movable portion 303 in the X direction is detected as a change in the magnetic field. By a pair made up of the position detection magnet 3013 located in left portion of fixed portion 301 and the Hall sensor 3033 located in the left portion of the movable portion 303, a displacement of the movable portion 303 in the Y direction is detected as a change in the magnetic field. The position of the movable portion 303 is detected based on the differences among the signals output from the Hall sensors 3033.

FIG. 5 is a functional block diagram illustrating the imaging apparatus 1 according to the first embodiment. The imaging apparatus of the present embodiment performs image stabilization, an ordinary still image photographing operation and a super-high resolution photographing operation. The image stabilization is processing for moving the movable portion 303 in such a manner as to suppress the image blurring attributable to hand shaking or the like. The ordinary still image photographing operation is processing for performing a photographing operation once and generating one image thereby. The super-high resolution photographing operation is processing for performing a photographing operation a number of times while shifting the movable portion 303 by a distance less than the pixel pitch, synthesizing a number of images obtained thereby, and generating a photographed image having a resolution higher than that of an ordinary still image.

As shown in FIG. 5, the imaging apparatus 1 comprises an image stabilization unit 206, a position signal processing unit 402, a position signal processing control unit 404, a subtractor 406, a driving control unit 408 and a motor driver 410. These elements are expressed as functional blocks in FIG. 5. These functions may be realized as hardware or as software. The position signal processing unit 402, position signal processing control unit 404, subtractor 406, driving control unit 408 and motor driver 410 shown in FIG. 5 are provided such a manner that the number of each of these is equal to the number of VCMs. In the description of the present embodiment, only the structure corresponding to one VCM will be mentioned. In FIG. 5, one of the VCMs provided in the image stabilization unit 206 (each VCM includes a magnet for movement and a coil) is shown as VCM 412, and one of the Hall sensors 3033 provided in the image stabilization unit 206 is shown as Hall sensor 414.

The position signal processing unit 402 receives an analog signal from the Hall sensor 414 of the image stabilization unit 206, converts the received analog signal into a current position signal representing the position of the movable portion 303, and supplies the current position signal to the subtractor 406. The position signal processing unit 402 outputs the current position signal in accordance with either the first settings or the second settings. According to the first settings, an analog signal from the Hall sensor 414 is regarded as corresponding to the whole movable range of the movable portion 303. According to the second settings, an analog signal from the Hall sensor 414 is regarded as corresponding to one of the divided movable ranges of the movable portion 303.

The position signal processing unit 402 comprises a position detection circuit 4021, an analog-to-digital converter (ADC) 4022, a position signal calculation unit 4023 and a position signal correction unit 4024.

Figure 6:
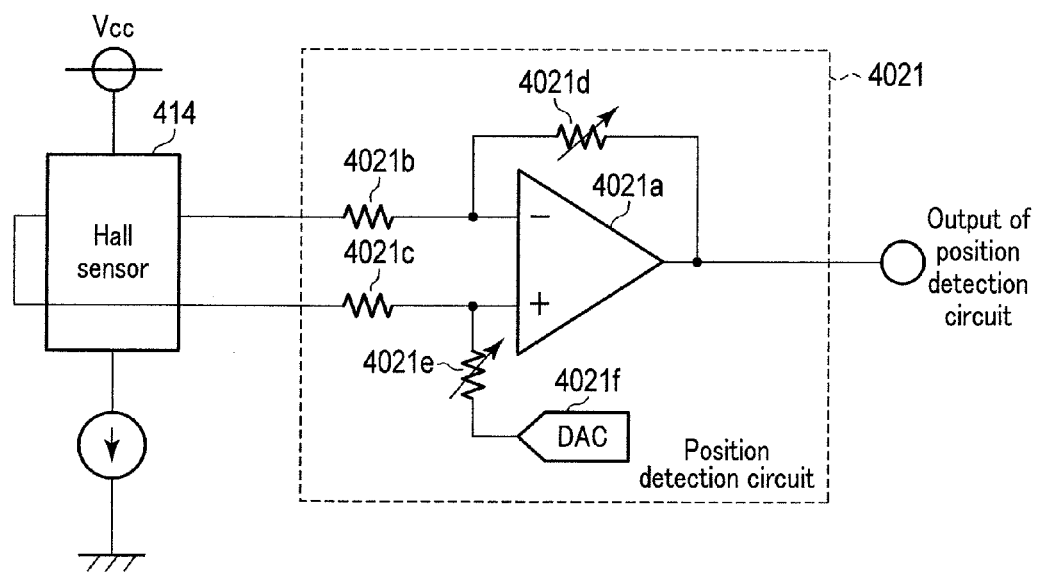
FIG. 6 illustrates the circuit configuration of an example of a position detection circuit.

The position detection circuit 4021 converts an analog signal output from the Hall sensor 414 into an analog signal corresponding to either the first settings or the second settings, and supplies the converted signal to the ADC 4022. FIG. 6 illustrates the circuit configuration of an example of the position detection circuit 4021. As shown in FIG. 6, the position detection circuit 4021 shown as an example is a differential amplifier circuit for which an amplification factor and offset can be set. The differential amplifier 4021 includes an operational amplifier 4021a, resistor 4021b, resistor 4021c, variable resistor 4021d, variable resistor 4021e, and digital-to-analog converter (DAC) 4021f.

In FIG. 6, the negative input terminal of the operational amplifier 4021a is connected to one end of resistor 4021b. The other end of resistor 4021b is connected to one end of the Hall sensor 414. The positive input terminal of the operational amplifier 4021a is connected to one end of resistor 4021c. The other end of resistor 4021c is connected to the other end of the Hall sensor 414. Variable resistor 4021d is connected between one end of resistor 4021b and the output terminal of the operational amplifier 4021a. One end of variable resistor 4021e is connected between the positive input terminal of the operational amplifier 4021a and one end of resistor 4021c. DAC 4021f is connected to the other end of variable resistor 4021e. With this structure, the amplification factor of the position detection circuit 4021 is determined in accordance with the resistance values of resistors 4021b and 4021a and the resistance values of variable resistors 4021d and 4021e. The offset of the position detection circuit 4021 is determined in accordance with the digital value of DAC 4021f. The resistance values of variable resistors 4021d and 4021e and digital value of the offset entered to the DAC 4021f are set by the position signal processing control unit 404.

It should be noted that the configuration of the position detection circuit 4021 shown in FIG. 6 is merely an example. For example, in the position detection circuit 4021 shown in FIG. 6, resistors 4021b and 4021c may be replaced with variable resistors and variable resistors 4021d and 4021e may be replaced with fixed resistors.

Figure 7A:
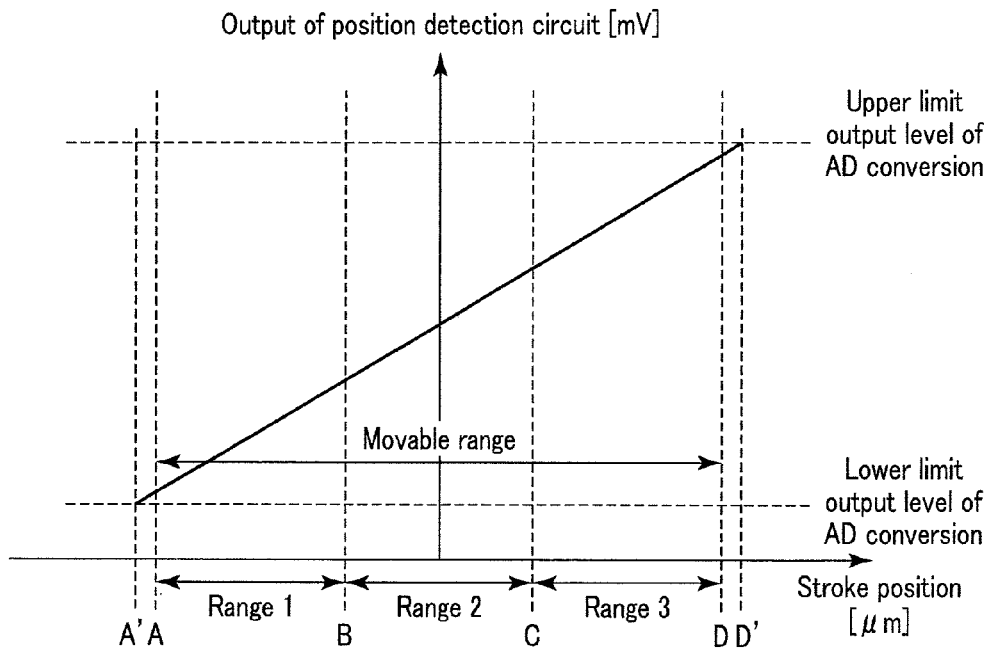
FIG. 7A shows an output which a position detection circuit produces in response to the stroke position of a movable portion when first settings are applied.

FIG. 7A shows an output which the position detection circuit 4021 produces in response to the stroke position (displacement) of the movable portion 303 when the first settings are applied. In the first settings, the amplification factor and the offset are determined in such a manner that the analog signal corresponding to the whole movable range of the movable portion 303 is in the range of the AD conversion of the ADC 4022. For example, when the stroke position is maximal position A on the negative side of the movable range, the ADC 4022 outputs a voltage value corresponding to the lower limit of the AD conversion. When the stroke position of the movable portion 303 is maximal position D on the positive side of the movable range, the ADC 4022 outputs a voltage value corresponding to the upper limit of the AD conversion. Therefore, the amplification factor and offset can be individually determined in accordance with the sensitivity of the Hall sensor 414.

Figure 7B:
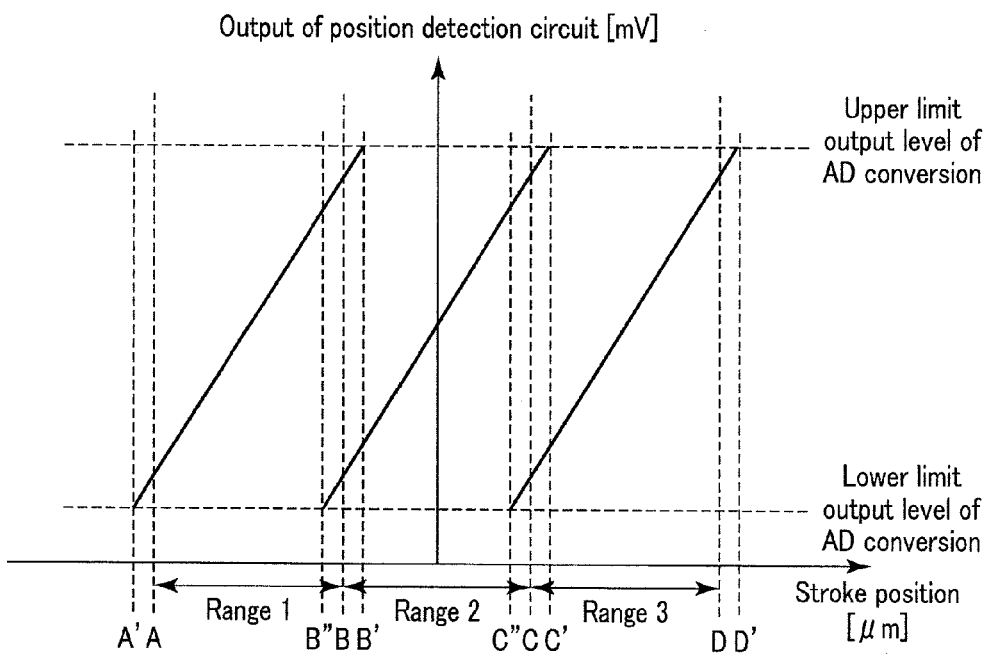
FIG. 7B shows an output which a position detection circuit produces in response to the stroke position of a movable portion when second settings are applied.

FIG. 7B shows an output which the position detection circuit 4021 produces in response to the stroke position (displacement) of the movable portion 303 when the second settings are applied. According to the second settings, the movable range of the movable portion 303 is divided into a plurality of divided ranges in which the position detection resolution is equal (that is, the rate of change of the output of the position detection circuit 4021 to the change of the position of the movable portion 303). For example, where the output of the position detection circuit 4021 changes linearly in response to the change in the stroke position of the movable portion 303, the movable range is divided equally. In the example shown in FIG. 7B, the movable range of the movable portion 303 is equally divided into three divided ranges, namely, range 1, range 2 and range 3. In the second settings, the amplification factor and the offset are determined such a manner that the analog signal is in the range of the AD conversion of the ADC 4022 in each of the divided ranges. For example, in range 1, the amplification factor and offset are determined, such a manner that when the stroke position is maximal position A on the negative side of the movable range, the ADC 4022 outputs a voltage value corresponding to the lower limit of the AD conversion, and such a manner that when the stroke position of the movable portion 303 is maximal position B on the positive side of the movable range, the ADC 4022 outputs a voltage value corresponding to the upper limit of the AD conversion. In range 2, the amplification factor and offset are determined, such a manner that when the stroke position is maximal position 3 on the negative side of the movable range, the ADC 4022 outputs a voltage value corresponding to the lower limit of the AD conversion, and such a manner that when the stroke position of the movable portion 303 is maximal position C on the positive side of the movable range, the ADC 4022 outputs a voltage value corresponding to the upper limit of the AD conversion. In range 3, the amplification factor and offset are determined, such a manner that when the stroke position is maximal position C on the negative side of the movable range, the ADC 4022 outputs a voltage value corresponding to the lower limit of the AD conversion, and such a manner that when the stroke position of the movable portion 303 is maximal position D on the positive side of the movable range, the ADC 4022 outputs a voltage value corresponding to the upper limit of the AD conversion. Where the settings are determined in this manner, the straight line in range 1, the straight line in range 2 and the straight line in range 3 have the same gradient. In other words, the position detection resolution is the same. The gradient of the straight line in each divided range is larger than the gradient of the straight line shown in FIG. 7A. According to the second settings, therefore, the amplification factor and offset can be individually determined in accordance with the sensitivity of the Hall sensor 414. If the sensitivity of the Hall sensor 414 is high, the number of ranges may be larger than three.

The stroke position of the movable portion 303 can vary depending upon the temperature characteristic or the like. In practice, therefore, the amplification factor and offset should be preferably determined in consideration of the variations in the movable range. For example, in the first settings, the amplification factor and offset are determined, such a manner that when the stroke position of the movable portion 303 is position A' less than position A by a predetermined distance, the ADC 4022 outputs a voltage value corresponding to the lower limit of the AD conversion, and such a manner that when the stroke position of the movable portion 303 is position D' more than position D by a predetermined distance, the ADC 4022 outputs a voltage value corresponding to the upper limit of the AD conversion. In the second settings, the amplification factor and offset are determined for range 1 shown in FIG. 7B, such a manner that when the stroke position of the movable portion 303 is position A' less than position A by a predetermined distance, the ADC 4022 outputs a voltage value corresponding to the lower limit of the AD conversion, and such a manner that when the stroke position of the movable portion 303 is position D' more than position D by a predetermined distance, the ADC 4022 outputs a voltage value corresponding to the upper limit of the AD conversion. Likewise, the amplification factor and offset are determined for range 2 shown in FIG. 7B, such a manner that when the stroke position of the movable portion 303 is position B" less than position B by a predetermined distance, the ADC 4022 outputs a voltage value corresponding to the lower limit of the AD conversion, and such a manner that when the stroke position of the movable portion 303 is position C' more than position C by a predetermined distance, the ADC 4022 outputs a voltage value corresponding to the upper limit of the AD conversion. Likewise, the amplification factor and offset are determined for range 3 shown in FIG. 7B, such a manner that when the stroke position of the movable portion 303 is position C" less than position C by a predetermined distance, the ADC 4022 outputs a voltage value corresponding to the lower limit of the AD conversion, and such a manner that when the stroke position of the movable portion 303 is position D' more than position D by a predetermined distance, the ADC 4022 outputs a voltage value corresponding to the upper limit of the AD conversion.

Reference will be made back to FIG. 5. The ADC 4022 converts an analog signal output from the position detection circuit 4021 into an AD value, which is a digital signal. FIG. 8A shows a result obtained when that output of the position detection circuit 4021 shown in FIG. 7A is subjected to AD conversion, and FIG. 8B shows a result obtained when that output (e.g., range 1) of the position detection circuit 4021 shown in FIG. 7B is subjected to AD conversion. As described above, the rate of change of the output of the position detection circuit 4021 to the change in the stroke position according to the second settings (that is, the gradient of the straight line shown in FIG. 7B) is higher than the rate of change of the output of the position detection circuit 4021 to the change in the stroke position according to the first settings (that is, the gradient of the straight line shown in FIG. 7A). Therefore, the resolution of the AD conversion according to the second settings (that is, the length [μm/LSB] represented by the least significant bit of the digital signal) is higher than the resolution of the AD conversion according to the first settings. That is, the second settings enable position detection to be performed with higher accuracy than the first settings.

The position signal calculation unit 4023 generates a current position signal, representing the current position of the movable portion 303, from the AD value obtained by the ADC 4022. The same position signal is generated without reference to the first settings and second settings. To be specific, whether the current settings are first settings or second settings, the current position signal representing the same position is generated for the analog signal output from the Hall sensor 414. The current position signal is generated, for example, by the calculation defined in the following formula:

$$\text{Current Position} = A \times (AD \text{ value}) + B \quad (1)$$

where the AD value is obtained by the ADC 4022, and A and B are constants which are predetermined depending upon whether the current settings are first settings or second settings and in accordance with one of ranges 1, 2 and 3 where the current settings are second settings.

FIG. 9 shows an example of how constants A and B are determined. The values of constants A and B shown in FIG. 9 are stored in a memory (not shown) of the position signal calculation unit 4023. In the example shown in FIG. 9, the ADC 402 is a 12-bit converter. The movable range of the movable portion 303 is −50 to 1050 μm. In consideration of the temperature characteristics of the movable portion 303 etc., the movable range is widened from the range of 1000 μm by ±50 μm. Of the movable range, range 1 is from −50 μm to 350 μm (400 μm), range 2 is from 300 μm to 700 μm (400 μm), and range 3 is from 650 μm to 1050 μm (400 μm). As mentioned above, in ranges 1, 2 and 3, the position detection resolution is equal. The resolution of the ADC 4022 is 0.29 [μm/LSB] according to first settings, and is 0.10 [μm/LDB] according to second settings. In these settings, constants A and B are determined in such a manner that the position detection resolution of a current position signal is 0.10 μm/LSB.

Figure 10A:
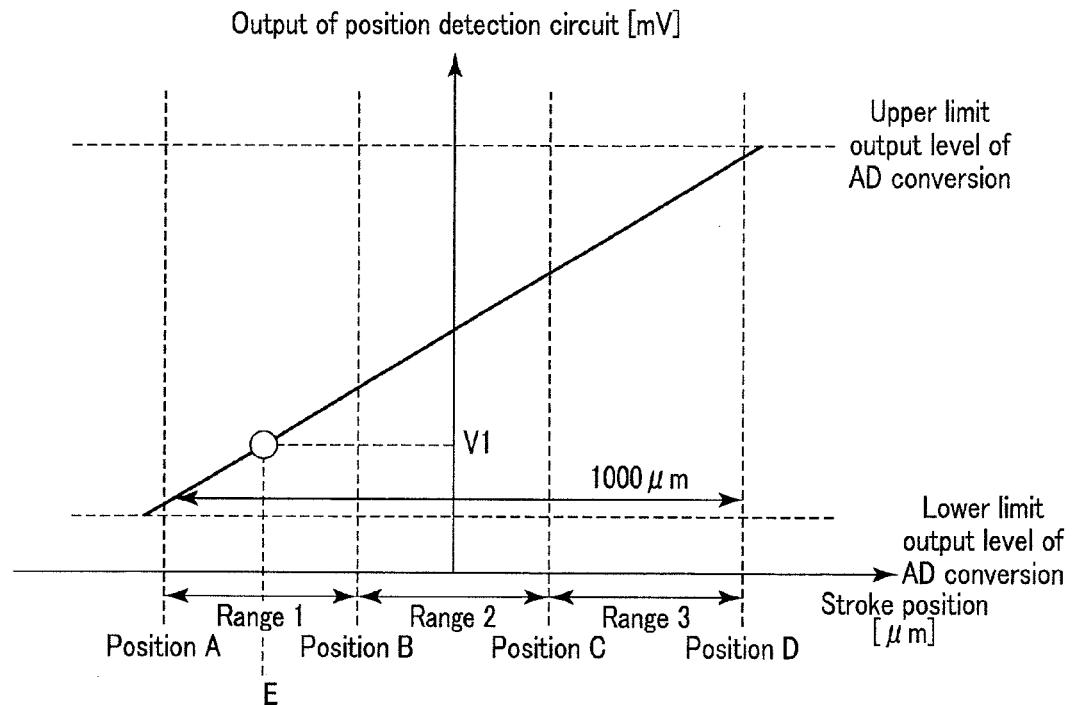
FIG. 10A and FIG. 10B show examples of outputs from the position detection circuit.
Figure 10B:
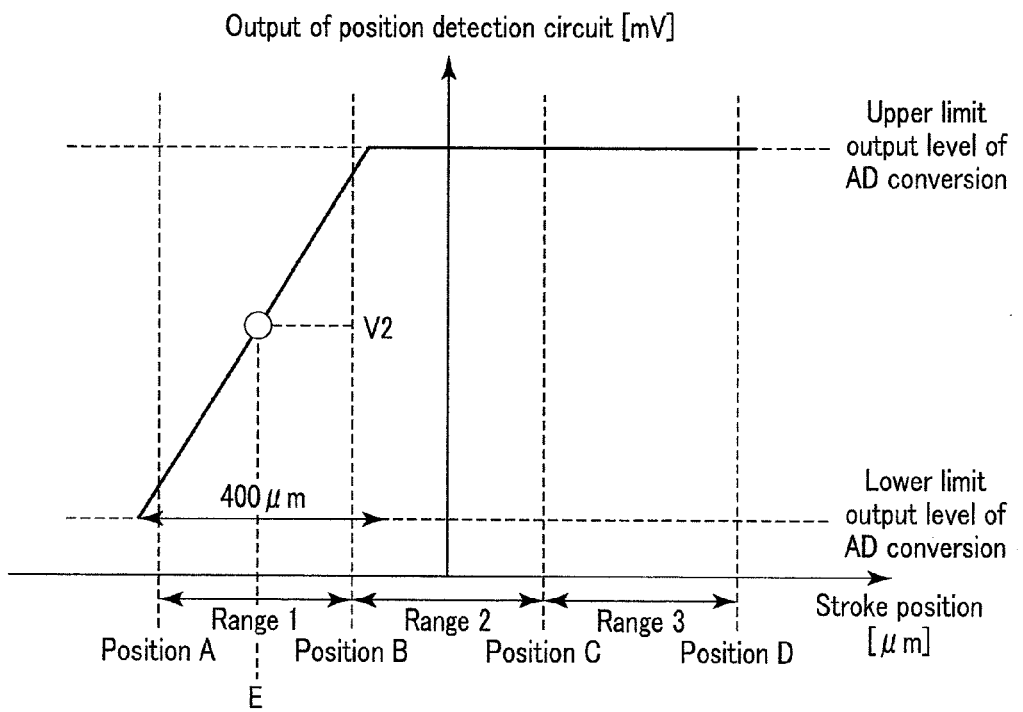

By determining constants A and B in the manner shown in FIG. 9, the same current position signal can be generated in response to the stroke position of the movable portion 303, without reference to where the movable portion 303 is located. For example, let us assume that in the first settings, the output of the position detection circuit 4021 corresponding to stroke position E in range 1 is V1 [mV], as shown in FIG. 10A. Let us also assume that in the second settings, the output of the position detection circuit 4021 corresponding to stroke position E in range 1 is V2 (V1<V2) [mV], as shown in FIG. 10B. Where constants A and B are determined in the manner shown in FIG. 9, the output of the position signal calculation unit 4023 is as shown in FIG. 11A according to the first settings, and is as shown in FIG. 11B according to the second settings. The straight line in FIG. 11B is the same as the straight line in FIG. 11A, except that it is a line in range 1 only. As can be seen from this, the output which the position signal calculation unit 4023 produces in response to the stroke position is the same whether the current settings are first settings or second settings.

The values of A and B in FIG. 9 are shown by way of example. The values of A and B may be varied in accordance with the width of the movable range of the movable portion 303, the bit configuration of the ADC 4022, the position detection resolution of the current position signal, etc.

The position signal correction unit 4024 corrects an error which may be included in the current position signal of the position signal calculation unit 4023 due to the temperature characteristic. The Hall sensor 414 has a temperature characteristic. Therefore, the position detection circuit 4021 may output different analog signals for the same position of the movable portion 303. The current position signals generated based on such analog signals may represent different positions, depending upon temperature. The position signal correction unit 4024 corrects an error attributable to such a temperature characteristic.

Figure 12A:
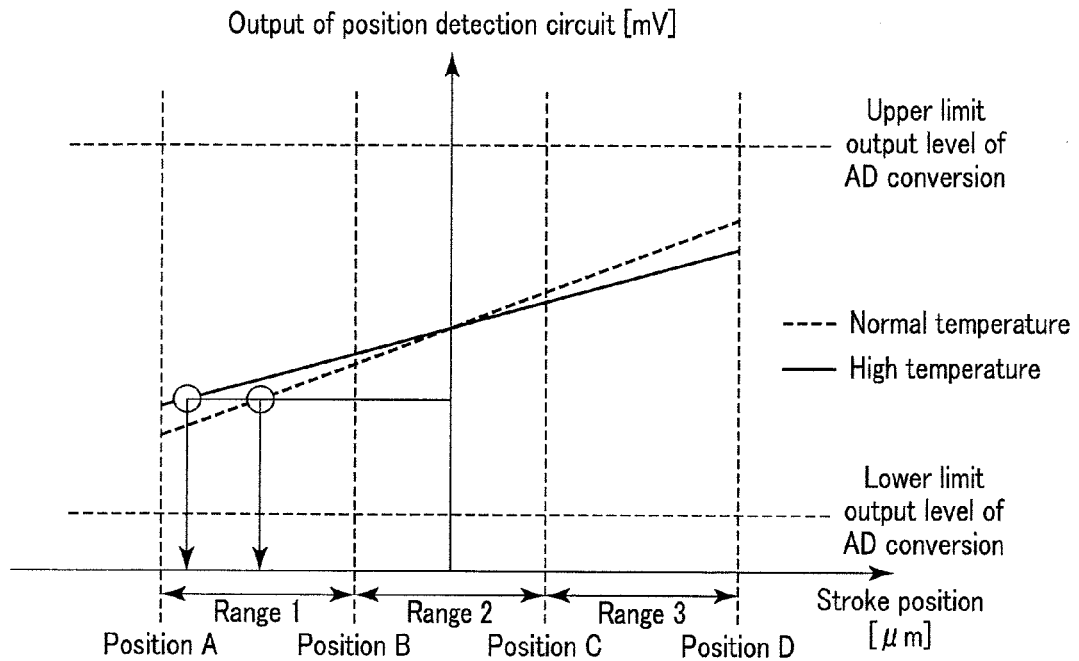
FIG. 12A shows an example of a temperature characteristic of an output which the position detection circuit produces in response to the stroke position when first settings are applied.
Figure 12B:
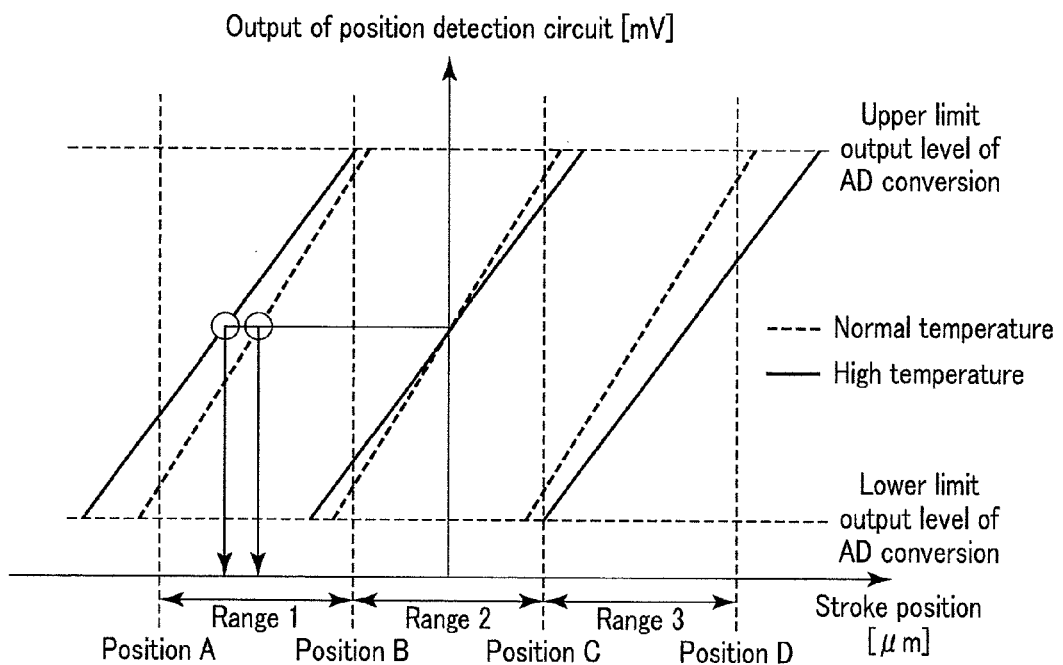
FIG. 12B shows an example of a temperature characteristic of an output which the position detection circuit produces in response to the stroke position when second settings are applied.

FIG. 12A shows an example of a temperature characteristic of an output which the position detection circuit 4021 produces in response to the stroke position when the first settings are applied. In FIG. 12A, the broken line indicates an example of data obtained at normal temperature (at 20° C. or thereabouts), while the solid line indicates an example of data obtained at high temperature (at 40° C. or thereabouts). As described above, the Hall sensor 414 has a temperature characteristic. Therefore, the position detection circuit 4021 may output different analog signals with respect to the same stroke position. FIG. 12B shows an example of a temperature characteristic of an output which the position detection circuit 4021 produces in response to the stroke position when the second settings are applied. In FIG. 12B, the broken line indicates an example of data obtained at normal temperature (at 20° C. or thereabouts), while the solid line indicates an example of data obtained at high temperature (at 40° C. or thereabouts). As can be seen, the position detection circuit 4021 may output different analog signals with respect to the same stroke position, depending upon the temperature, not only when the first settings are applied but also when the second settings are applied. In order to correct the output differences which the position detection circuit 4021 may undergo due to the temperature characteristic, the position signal correction unit 4024 corrects the current position signal of the position signal calculation unit 4023 such a manner that it becomes identical to the current position signal obtained immediately after the switching between the first settings and the second settings. The correction value used for this purpose is a difference value between the current position signals obtained before and after the switching of settings.

In response to a timing signal supplied from the control circuit 212, the position signal processing control unit 404 supplies the position signal processing unit 402 with a position signal processing parameter, by which the second settings are applied to the positional signal processing unit 402. The position signal processing parameter includes an amplification factor and an offset, which are to be applied to the position detection circuit 4021. To be more specific, the position signal processing control unit 404 stores the following in its memory (not shown): an amplification factor and an offset corresponding to the whole range of the movable portion 303 according to the first settings; an amplification factor and an offset corresponding to range 1 according to the second settings; an amplification factor and an offset corresponding to range 2 according to the second settings; and an amplification factor and an offset corresponding to range 3 according to the second settings. In addition, the position signal processing parameter includes a correction value used by the position signal correction unit 4024. To be more specific, the position signal processing control unit 404 calculates a correction value from the current position signals generated immediately before and after the switching between the first settings and the second settings.

The subtractor 406 supplies the driving control unit 408 with a deviation signal, which is obtained from (i) a driving target position signal supplied from the control circuit 212 and representing the driving target position of the movable portion 303 and (ii) a current position signal generated by the position signal processing unit 402.

Based on the deviation signal supplied from the subtractor 406, the driving control unit 408 generates a driving signal, which indicates the value of a driving current for driving the VCM 412, and supplies the generated driving signal to the motor driver 410, thereby performing the feedback control of the position of the movable portion 303.

The motor driver 410 supplies a driving current corresponding to the driving signal from the driving control unit 408 to the VCM 412 (specifically to coils 3031, 3032a, 3032b), thereby displacing the movable portion 303.

Figure 13:
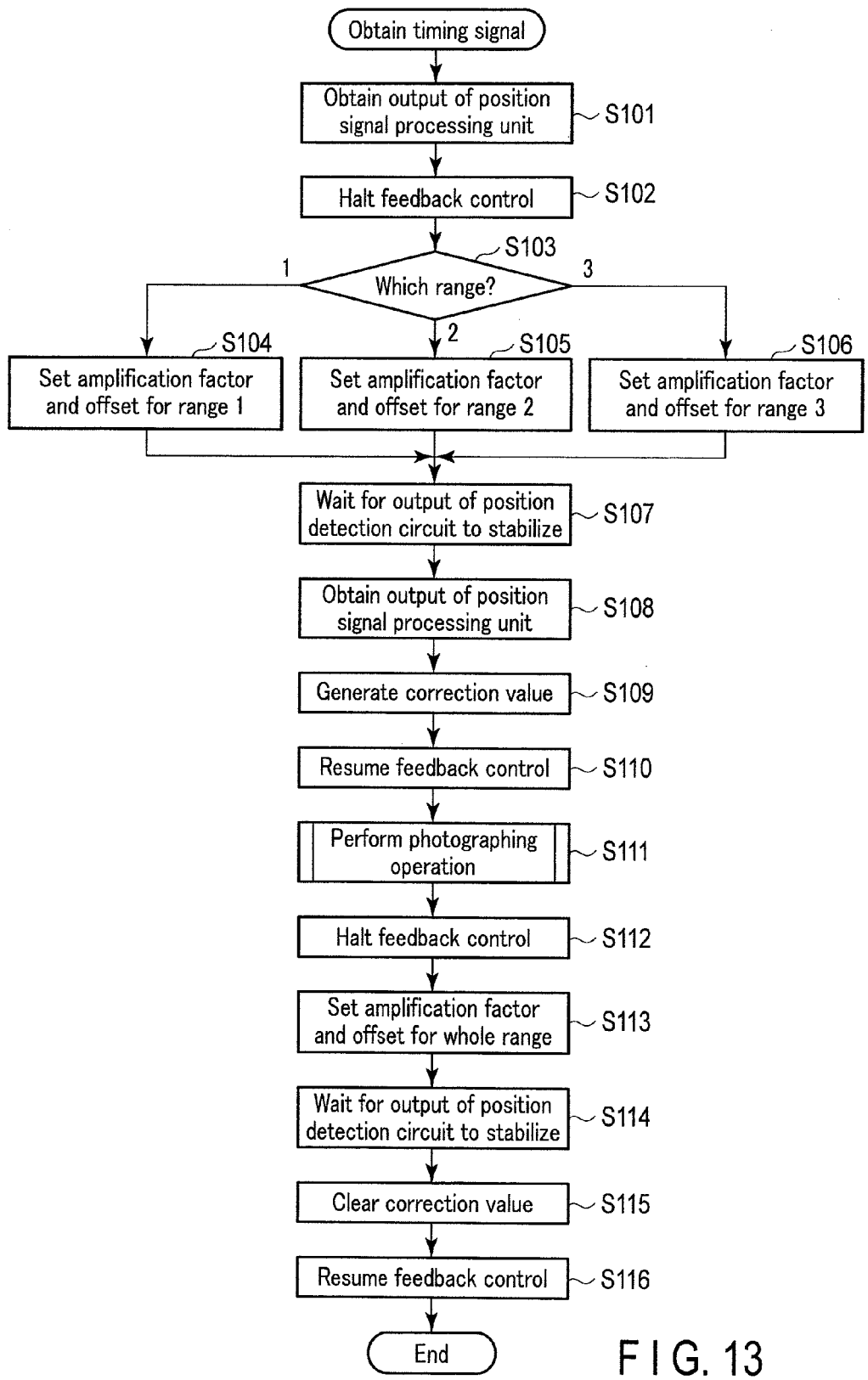
FIG. 13 is a flowchart illustrating an operation of an image stabilization unit according to the first embodiment.

A description will now be given of an operation of the image stabilization unit 206 according to the first embodiment. FIG. 13 is a flowchart illustrating an operation of the image stabilization unit 206. The processing shown in FIG. 13 is started when the image stabilization unit 206 obtains a timing signal. The image stabilization unit 206 obtains the timing signal, for example, when the user operates the operation portion 210 and enters either an instruction to start a still image photographing operation or an instruction to start a super-high resolution photographing operation.

In step S101, the position signal processing control unit 404 obtains a current position signal output from the position signal processing unit 402 to which the first settings are applied. According to the first settings, the resolution of the ADC 4022 may be low, but a current position signal can be obtained no matter where in the movable range the stroke position of the movable portion 303 may be.

In step S102, the position signal processing control unit 404 halts the feedback control performed by the driving control unit 408. This processing is intended to stabilize the output of the position signal processing unit 402. After the halt of the feedback control, the processing flow advances to step S103.

In step S103, the position signal processing control unit 404 determines in which range (range 1, range 2 or range 3) the current movable portion 303 is located, based on the current position signal supplied from the position signal processing unit 402. If it is determined in step S103 that the current movable portion 303 is located in range 1, the control flow advances to step S104. If it is determined in step S103 that the current movable portion 303 is located in range 2, the control flow advances to step S105. If it is determined in step S103 that the current movable portion 303 is located in range 3, the control flow advances to step S106.

In step S104, the position signal processing control unit 404 applies the second settings for range 1. To be specific, the position signal processing control unit 404 selects an amplification factor and an offset required for applying the second settings for range 1, and sets these to the position detection circuit 4021. Subsequently, the flow advances to step S107. In step S105, the position signal processing control unit 404 applies the second settings for range 2. To be specific, the position signal processing control unit 404 selects an amplification factor and an offset required for applying the second settings for range 2, and sets these to the position detection circuit 4021. Subsequently, the flow advances to step S107. In step S106, the position signal processing control unit 404 applies the second settings for range 3. To be specific, the position signal processing control unit 404 selects an amplification factor and an offset required for applying the second settings for range 3, and sets these to the position detection circuit 4021. Subsequently, the flow advances to step S107. According to the second settings, the current rough position of the movable portion 303 is specified based on the current position signal obtained according to the first settings. The signal obtaining range of the position detection circuit 4021 is limited in accordance with the specified rough position. As a result, the resolution of the ADC 4022 can be increased.

In step S107, the position signal processing control unit 404 waits for the output of the position detection circuit 4021 to stabilize. For example, the position signal processing control unit 404 waits for the time change of the current position signal, output from the position signal correction unit 402, to become equal to a predetermined threshold. Alternatively, the position signal processing control unit 404 waits for a predetermined time within which the output of the position detection circuit 4021 is considered to have stabilized. After the output of the position detection circuit 4021 has stabilized, the flow advances to step S108.

In step S108, the position signal processing control unit 404 obtains a current position signal output from the position signal processing unit 402. In step S109, the position signal processing control circuit 404 generates a correction value to be used in the position signal correction unit 4024, based on the current position signal obtained immediately after the second settings are applied, i.e., based on the current position signal obtained in step S108. The correction value is, for example, a difference value between the value of the current position signal obtained when the first settings are applied and the value of the current position signal obtained immediately after switching to the second settings. The deviation of the current position signal caused by the temperature characteristic can be corrected by correcting the current position signal obtained when the second settings are applied, based on the correction value.

In step S110, the position signal processing control unit 404 resumes the feedback control by the driving control unit 408. In step S111, the control circuit 212 resumes the photographing operation. The photographing operation will be described later. At the end of the photographing operation, the flow advances to step S112.

In step S112, the position signal processing control unit 404 halts the feedback control performed by the driving control unit 408. In step S113, the position signal processing control unit 404 applies the first settings. To be specific, the position signal processing control unit 404 selects an amplification factor and an offset required for applying the first settings to the position detecting circuit 4021, and sets these to the position detection circuit 4021.

In step S114, the position signal processing control unit 404 waits for the output of the position detection circuit 4021 to stabilize. In step S115, the position signal processing control unit 404 clears the correction value from the position signal correction unit 4024.

In step S116, the position signal processing control unit 404 resumes the feedback control by the driving control unit 408. In the next processing, therefore, the position signal processing control unit 404 obtains the output of the position signal processing unit 402 to which the first settings are applied.

Figure 14:
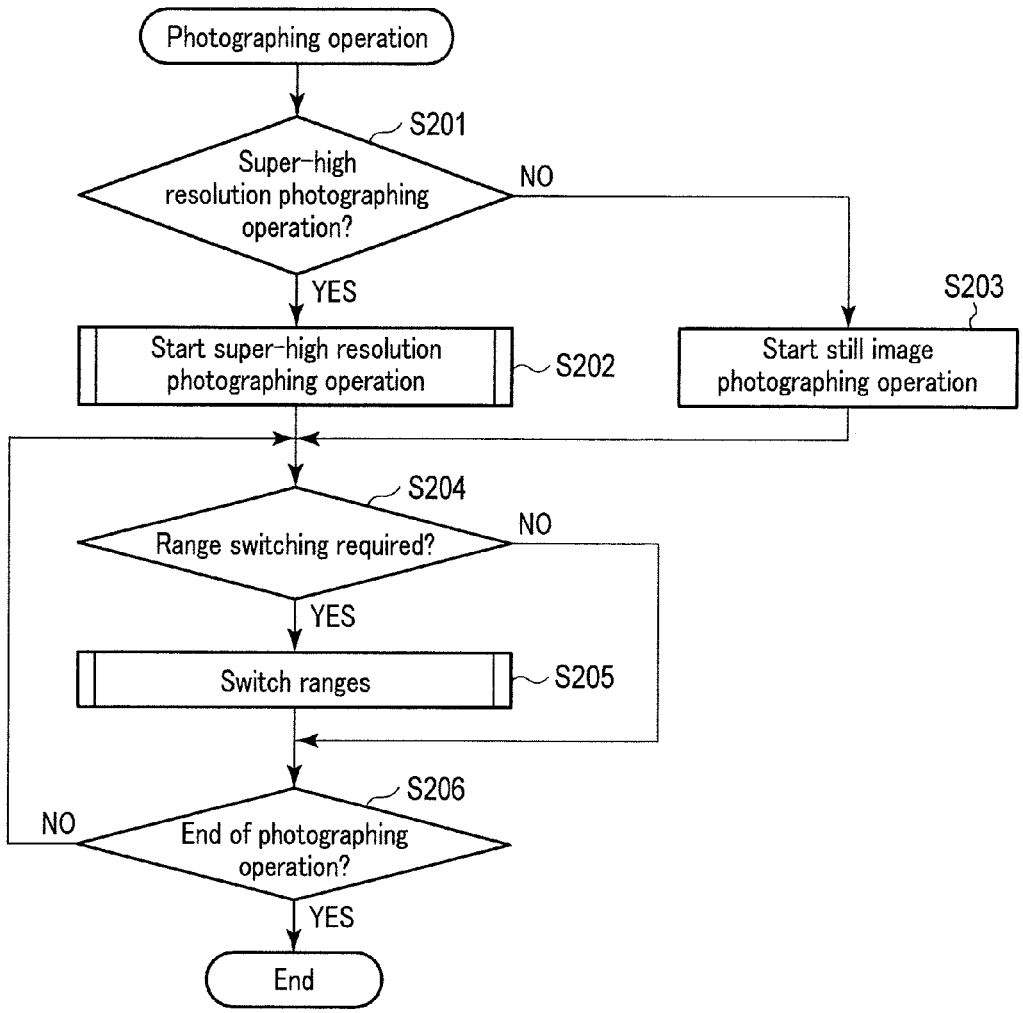
FIG. 14 is a flowchart illustrating a photographing operation according to the first embodiment.

FIG. 14 is a flowchart illustrating a photographing operation. In step S201, the control circuit 212 determines whether an instruction for starting a super-high resolution photographing operation is entered at the present time. If it is determined in step S201 that the instruction for starting the super-high resolution photographing operation is entered, the control flow advances to step S202. If it is determined in step S201 that the instruction for starting a super-high resolution photographing operation is not entered and that an instruction for starting a still image photographing operation is entered, then the control flow advances to step S203.

Figure 16:
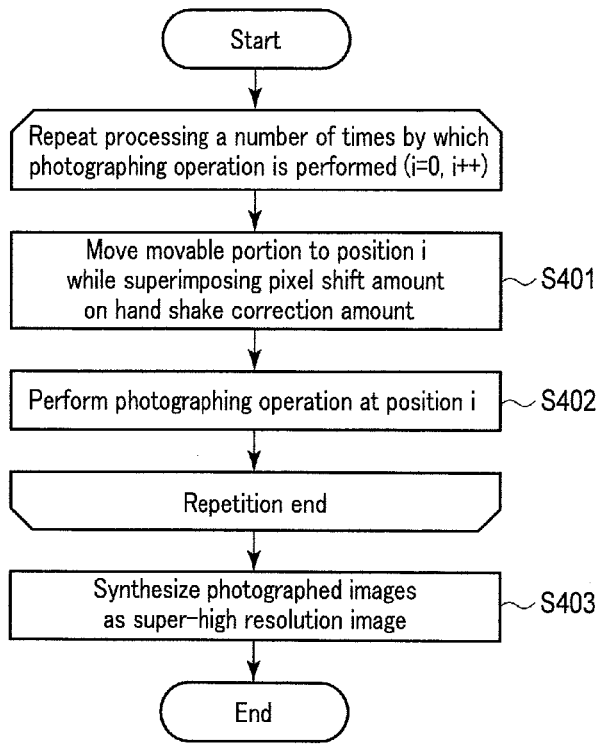
FIG. 16 is a flowchart illustrating a super-high resolution photographing operation.
Figure 17A:
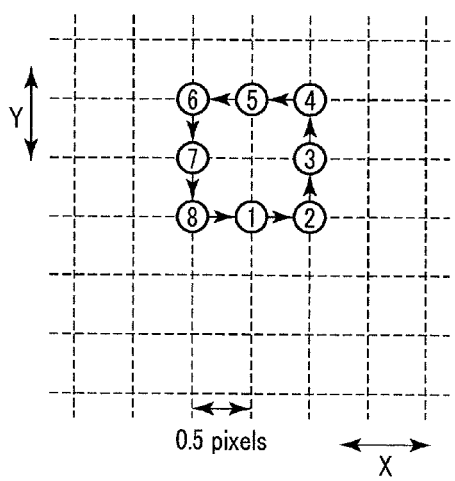
FIG. 17A and FIG. 17B shows examples of driving target positions in a super-high resolution photographing operation.
Figure 17B:
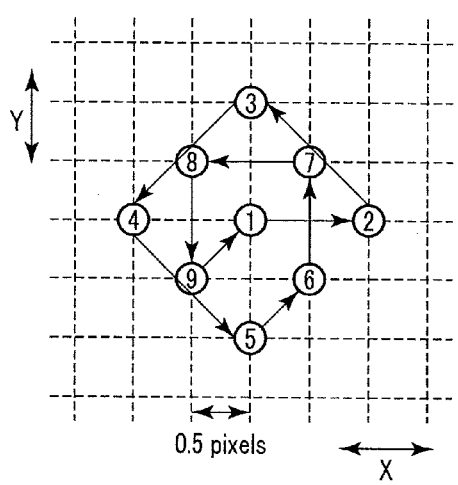

In step S202, the control circuit 212 starts the super-high resolution photographing operation. The super-high resolution photographing operation will be described with reference to FIG. 16. In the super-high resolution photographing operation, the control circuit 212 performs loop processing to repeat super-high resolution photographing $i$ times. First, in step S401, the control circuit 212 generates a driving target position for moving the movable portion 303 of the image stabilization unit 206 to position $i$. A predetermined fixed value may be used as the target position of the super-high resolution photographing operation. FIGS. 17A and 17B show examples of target positions in super-high resolution photographing operation. FIG. 17A illustrates a case where the movable portion 303 is moved 8 times from an initial position 1 ($i=0$) in such a manner as to describe a square. In this case, 8 target positions (namely, $i=0$ to $i=7$) are determined. FIG. 17B illustrates a case where the movable portion 303 is moved 9 times from the initial position 1, and the movements of the movable portion 303 includes movements in oblique directions. In this case, 9 target positions (namely, $i=0$ to $i=8$) are determined. The movements in FIGS. 17A and 17B are shown by way of example. How target positions are determined is not restricted as long as the movements defined by them are a combination of upward, downward, leftward, rightward and oblique-direction movements.

When hand shaking is occurring during a super-high resolution photographing operation, the control circuit 212 superimposes a signal corresponding to the hand shaking on a driving target position signal. The control circuit 212 supplies the resultant superimposed signal to the image stabilization unit 206 as a driving target position signal. Based on the deviation signal between the driving target position signal and the current position signal, the driving control unit 408 generates a driving signal, which indicates the value of a driving current for driving the VCM 412, and supplies the generated driving signal to the motor driver 410, thereby performing the feedback control of the position of the movable portion 303.

In step S402, the control circuit 212 starts the driving of the imaging element of the image stabilization unit 206. The control circuit 212 stores an image obtained by the image stabilization unit 206 in a RAM (not shown). If the i-th photographing operation has not yet been ended, the value of i is incremented, and the control flow returns to step S401, which is the start of loop processing. If the i-th photographing operation has been ended, the flow advances to step S403.

In step S403, the image processing unit of the image stabilization unit 206 synthesizes the $i$ images obtained by performing a photographing operation $i$ times, thereby generating a super high-resolution image. Then, the processing in FIG. 16 is brought to an end.

Reference will be made back to FIG. 14. In step S203, the control circuit 212 starts a still image photographing operation. The still image photographing operation will be described briefly. When hand shaking is occurring in the still image photographing operation, the control circuit 212 generates a signal corresponding to the hand shaking as a driving target position. The control circuit 212 supplies this driving target position to the image stabilization unit 206. Based on the deviation signal between the driving target position signal and the current position signal, the driving control unit 408 generates a driving signal, which indicates the value of a driving current for driving the VCM 412, and supplies the generated driving signal to the motor driver 410, thereby performing the feedback control of the position of the movable portion 303. Thereafter, the control circuit 212 starts the driving of the imaging element of the image stabilization unit 206. The control circuit 212 stores an image obtained by the image stabilization unit 206 in a RAM (not shown). Then, the image processing unit of the image stabilization unit 206 generates an image obtained by performing a photographing operation. In this manner, the still image photographing operation is ended.

After the photographing operation is started in steps S202 and S203, the control flow advances to step S204 without waiting for the photographing operation to end. In step S204, the position signal processing control unit 404 determines whether or not range switching is required. If there is a change in the current position signal supplied from the position signal processing unit 402, it is determined that the range switching is required. It may be determined that the range switching is required, only when the change in the current position signal is more than a predetermined value. If it is determined in step S204 that the range switching is required, the control flow advances to step S205. If it is not determined in step S204 that the range switching is required, the control flow returns to step S204 until it is determined in step S206 that the photographing operation has ended.

In step S205, the position signal processing control unit 404 switches ranges. A description will be given of the range switching processing with reference to FIG. 15.

In step S301, the position signal processing control unit 404 halts the feedback control performed by the driving control unit 408. After the halt of the feedback control, the processing flow advances to step S302.

In step S302, the position signal processing control unit 404 determines in which range (range 1, range 2 or range 3) the current movable portion 303 is located, based on the current position signal output from the position signal processing unit 402. If it is determined in step S302 that the current movable portion 303 is located in range 1, the control flow advances to step S303. If it is determined in step S302 that the current movable portion 303 is located in range 2, the control flow advances to step S304. If it is determined in step S302 that the current movable portion 303 is located in range 3, the control flow advances to step S305.

In step S303, the position signal processing control unit 404 applies the second settings for range 1. Subsequently, the flow advances to step S306. In step S304, the position signal processing control unit 404 applies the second settings for range 2. Subsequently, the flow advances to step S306. In step S305, the position signal processing control unit 404 applies the second settings for range 3. Subsequently, the flow advances to step S306.

In step S306, the position signal processing control unit 404 waits for the output of the position detection circuit 4021 to stabilize. After the output of the position detection circuit 4021 has stabilized, the flow advances to step S307.

In step S307, the position signal processing control unit 404 obtains a current position signal output from the position signal processing unit 402. In step S308, the position signal processing control circuit 404 generates a correction value to be used in the position signal correction unit 4024, based on the current position signal obtained immediately after the range switching, i.e., based on the current position signal obtained in step S307. The correction value is, for example, a difference value between the value of the current position signal obtained when the first settings are applied and the value of the current position signal obtained immediately after the range switching.

Figure 15:
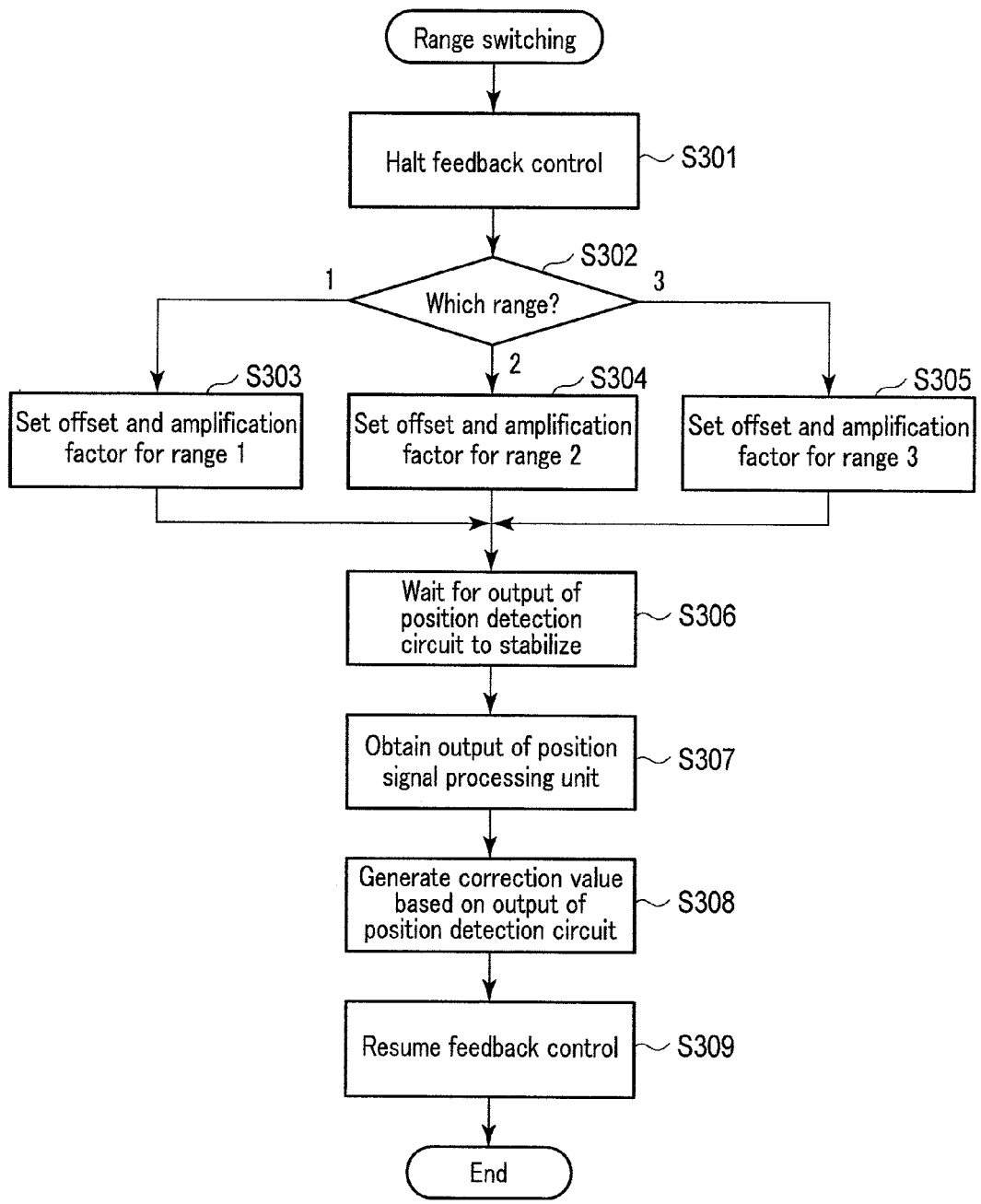
FIG. 15 is a flowchart illustrating range switching processing according to the first embodiment.

In step S309, the position signal processing control unit 404 resumes the feedback control by the driving control unit 408. Then, the processing in FIG. 15 is brought to an end.

Reference will be made back to FIG. 14. After the end of step S205, the control flow returns to step S204 until it is determined in step S206 that the photographing operation has ended.

As described above, according to the present embodiment, the position of the movable portion 303 is roughly detected according to the first settings (which provide low-resolution AD conversion but enable the stroke position of the movable portion 303 to be detected in a wide range), and then the position of the movable portion 303 is detected with high accuracy according to the second settings (which provide detection of the stroke position of the movable portion 303 in a narrow range but enables high-resolution AD conversion). Accordingly, high-accuracy position detection can be made in the whole range of the stroke of the movable portion 303.

The ranges of the movable portion 303 according to the second settings are determined in such a manner that the position detection resolution is equal. Owing to this feature, the position detection resolution does not vary depending upon the ranges, and highly accurate position detection is enabled in each of the divided ranges.

In the embodiment described above, the output of the position detection circuit 4021 changes linearly in response to the change in the stroke position of the movable portion 303. In this case, the movable range is divided equally. Depending upon the characteristic of the position detection circuit 4021, there may be a case where the output of the position detection circuit 4021 changes non-linearly in response to the change in the stroke position of the movable portion 303, as shown in FIG. 18A. In this case as well, the ranges are determined such a manner that the position detection resolution is equal. In other words, the ranges are determined such a manner that the gradient of the curved line in each divided range (e.g., the gradient at the center position of each range) is equal. Ranges 1, 2 and 3 are not equally divided ranges, as shown in FIG. 18B. As can be seen from this, the whole range is divided in such a manner as to provide an equal position detection resolution; it is not simply divided into equal portions.

Second Embodiment

Figure 19:
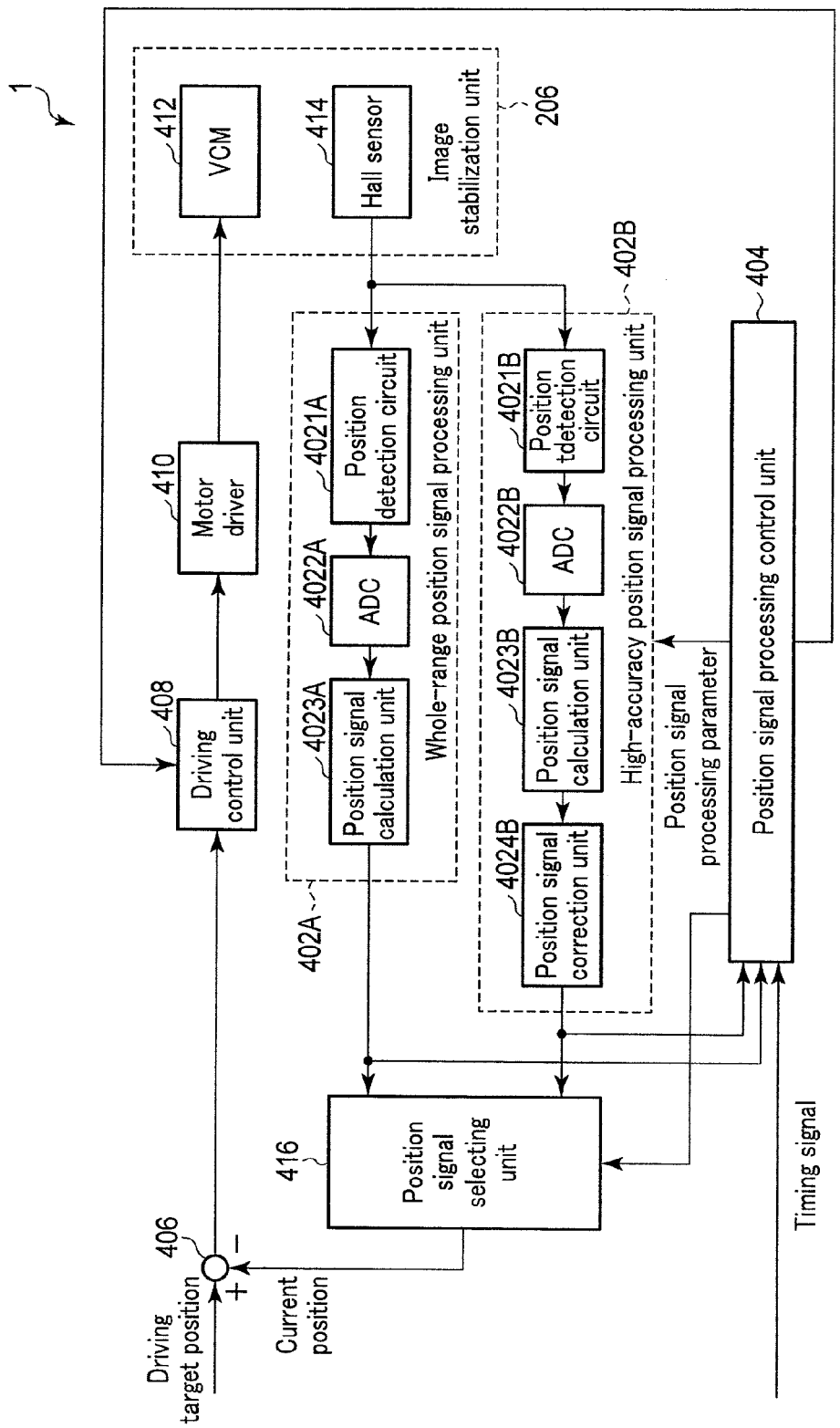
FIG. 19 is a functional block diagram illustrating an imaging apparatus according to the second embodiment.

A description will now be given of the second embodiment of the present invention. FIG. 19 is a functional block diagram illustrating the imaging apparatus 2 according to the second embodiment. In FIG. 19, the same reference symbols as used in FIG. 5 denote similar or corresponding structural elements, and a detailed description of such elements will be omitted. The schematic structure of the imaging apparatus 1 and the structure of the image stabilizing unit 206 are similar to those described with reference to FIGS. 1 to 4, and a description of these structures will be omitted.

The imaging apparatus 1 shown in FIG. 19 comprises a whole-range position signal processing unit 402A and a high-accuracy position signal processing unit 402B, in place of the position signal processing unit 402 described above. In addition, the imaging apparatus 1 shown in FIG. 19 comprises a position signal selecting unit 416.

The whole-range position signal processing unit 402A is a position signal processing unit to which the first settings described in relation to the first embodiment are applied. The whole-range position signal processing unit 402A comprises a whole-range position detection circuit 4021A, an ADC 4022A and a position signal calculation unit 4023A. The high-accuracy position signal processing unit 402B is a position signal processing unit to which the second settings described in relation to the first embodiment are applied. The high-accuracy position signal processing unit 402B comprises a high-accuracy position detection circuit 4021B, an ADC 4022B, a position signal calculation unit 4023B and a position signal correction unit 4024B.

The whole-range position detection circuit 4021A converts an analog signal output from the Hall sensor 414 into an analog signal corresponding to the first settings, and supplies the converted signal to the ADC 4022A. The high-accuracy position detection circuit 4021B converts an analog signal output from the Hall sensor 414 into an analog signal corresponding to the second settings, and supplies the converted signal to the ADC 4022B.

FIG. 20 illustrates the circuit configurations of an example of a whole-range position detection circuit 4021A and an example of a high-accuracy position detection circuit 4021B. As shown in FIG. 20, the whole-range position detection circuit 4021A shown as an example is a differential amplifier circuit having a fixed amplification factor and a fixed offset. The differential amplifier 4021A includes an operational amplifier 4021Aa, resistor 4021Ab, resistor 4021Ac, resistor 4021Ad, and resistor 4021Ae. In FIG. 20, the negative input terminal of the operational amplifier 4021Aa is connected to one end of resistor 4021Ab. The other end of resistor 4021Ab is connected to one end of the Hall sensor 414. The positive input terminal of the operational amplifier 4021Aa is connected to one end of resistor 4021Ac. The other end of resistor 4021Ac is connected to the other end of the Hall sensor 414. Resistor 4021Ad is connected between one end of resistor 4021Ab and the output terminal of the operational amplifier 4021Aa. One end of resistor 4021Ae is connected between the positive input terminal of the operational amplifier 4021Aa and one end of resistor 4021Ac. A predetermined offset (e.g., an offset corresponding to one half of the power-supply voltage Vcc of the Hall sensor 414) is provided for the other end of resistor 4021Ae. With this structure, the amplification factor of the whole-range position detection circuit 4021A is a fixed value determined by the resistance values of resistors 4021Ab, 4021Ac, 4021Ad and 4021Ae. The offset provided for the whole-range position detection circuit 4021A is Vcc/2.

As shown in FIG. 20, the high-accuracy position detection circuit 4021B shown as an example is a differential amplifier circuit having a variable amplification factor and a variable offset. The differential amplifier 4021B includes an operational amplifier 4021Ba, resistor 4021Bb, resistor 4021Bc, variable resistor 4021Bd, variable resistor 4021Be, and DAC 4021Bf. In FIG. 20, the negative input terminal of the operational amplifier 4021Ba is connected to one end of resistor 4021Bb. The other end of resistor 4021Bb is connected to one end of the Hall sensor 414. The positive input terminal of the operational amplifier 4021Ba is connected to one end of resistor 4021Bc. The other end of resistor 4021Bc is connected to the other end of the Hall sensor 414. Variable resistor 4021Bd is connected between one end of resistor 4021Bb and the output terminal of the operational amplifier 4021Ba. One end of variable resistor 4021Be is connected between the positive input terminal of the operational amplifier 4021Ba and one end of resistor 4021Bc. DAC 4021Bf is connected to the other end of variable resistor 4021Be. With this structure, the amplification factor of the high-accuracy position detection circuit 4021B is determined in accordance with the resistance values of resistors 4021Bb and 4021Bc and the resistance values of variable resistors 4021Bd and 4021Be. The offset of the high-accuracy position detection circuit 4021B is determined in accordance with the digital value of DAC 4021Bf. The resistance values of variable resistors 4021Bd and 4021Be and digital value of the offset entered to the DAC 4021Bf are set by the position signal processing control unit 404. It should be noted that the configuration of the high-accuracy position detection circuit 4021 shown in FIG. 20 is merely an example. For example, resistors 4021Bb and 4021Bc may be replaced with variable resistors, and variable resistors 4021Bd and 4021Be may be replaced with fixed resistors.

The ADC 4022A converts an analog signal output from the whole-range position detection circuit 4021A into an AD value, which is a digital signal. The ADC 4022B converts an analog signal output from the high-accuracy position detection circuit 4021B into an AD value, which is a digital signal. The whole-range position detecting circuit 4021A outputs an analog signal corresponding to the first settings, and the high-accuracy position detecting circuit 4021B outputs an analog signal corresponding to the second settings. Therefore, the resolution of the AD conversion of ADC 4022B is higher than that of the AD conversion of ADC 4022A.

Position signal calculating unit 4023A generates a current position signal, representing the current position of the movable portion 303, from the AD value obtained by ADC 4022A. Position signal calculating unit 4023B generates a current position signal, representing the current position of the movable portion 303, from the AD value obtained by ADC 4022B. Position signal calculating unit 4023A and position signal calculation unit 4023B generate current position signals according to formula (1) mentioned above. Position signal calculating unit 4023A stores only the values of constants A and B for the first settings, and position signal calculation unit 4023B stores only the values of constants A and B for ranges 1, 2 and 3 of the second settings.

The position signal correction unit 4024B corrects an error which may be included in the current position signal of the position signal calculation unit 4023B due to the temperature characteristic. The error is corrected in the same way as in the first embodiment.

The position signal selecting unit 416 selects either the current position signal output from the whole-range position signal processing unit 402A or the current position signal output from the high-accuracy position signal processing unit 402B in accordance with an instruction supplied from the position signal processing control unit 404, and supplies the selected current position signal to the subtractor 406.

Figure 21:
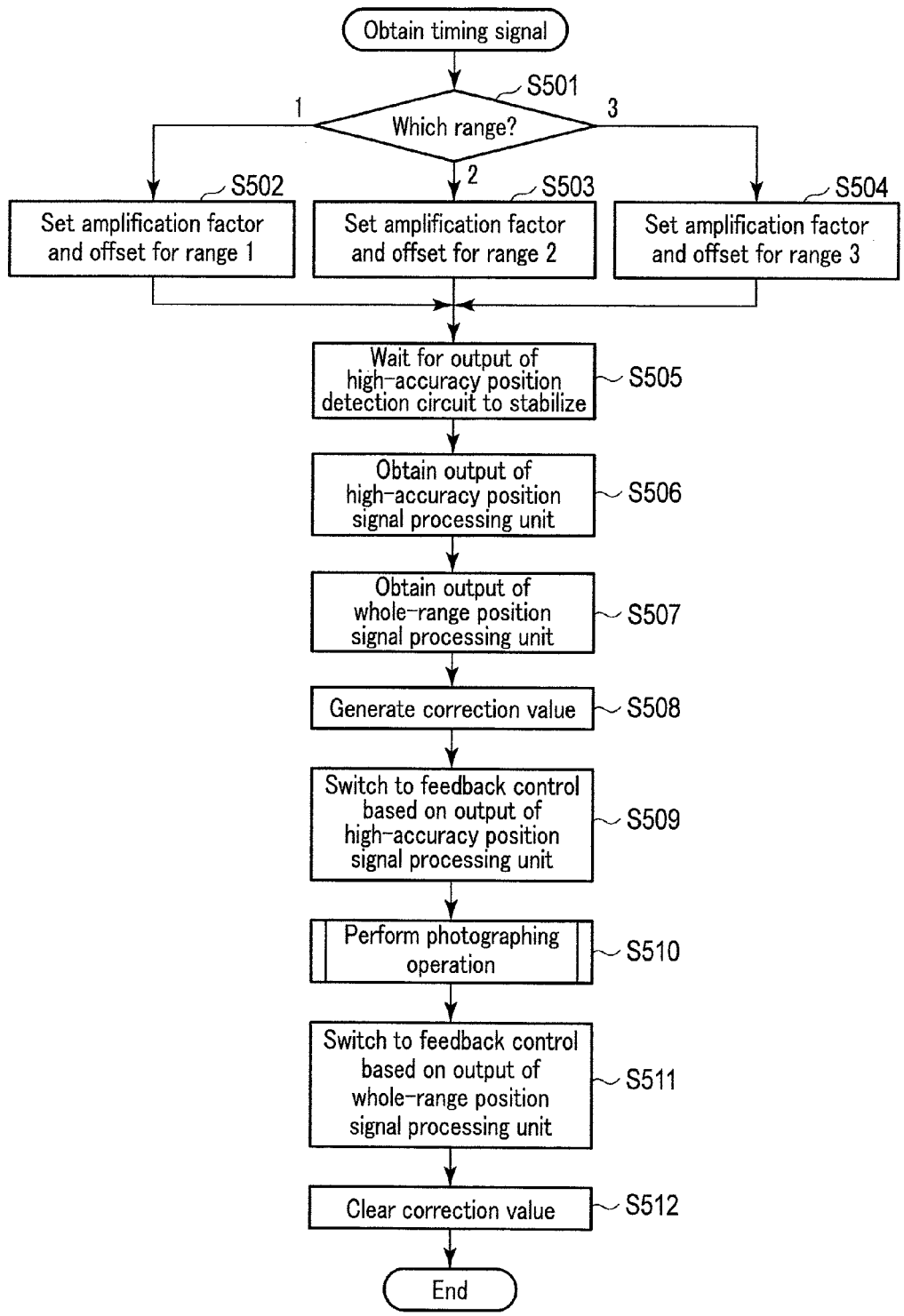
FIG. 21 is a flowchart illustrating an operation of an image stabilization unit according to the second embodiment.

A description will now be given of an operation of the image stabilization unit 206 according to the second embodiment. FIG. 21 is a flowchart illustrating an operation of the image stabilization unit 206.

In step S501, the position signal processing control unit 404 determines in which range (range 1, range 2 or range 3) the current movable portion 303 is located, based on the current position signal output from the whole-range position signal processing unit 402A. If it is determined in step S501 that the current movable portion 303 is located in range 1, the control flow advances to step S502. If it is determined in step S501 that the current movable portion 303 is located in range 2, the control flow advances to step S503. If it is determined in step S501 that the current movable portion 303 is located in range 3, the control flow advances to step S504.

In step S502, the position signal processing control unit 404 applies the second settings for range 1. To be specific, the position signal processing control unit 404 selects an amplification factor and an offset required for applying the second settings for range 1, and sets these to the high-accuracy position detection circuit 4021B. Subsequently, the flow advances to step S505. In step S503, the position signal processing control unit 404 applies the second settings for range 2. To be specific, the position signal processing control unit 404 selects an amplification factor and an offset required for applying the second settings for range 2, and sets these to the high-accuracy position detection circuit 4021B. Subsequently, the flow advances to step S505. In step S504, the position signal processing control unit 404 applies the second settings for range 3. To be specific, the position signal processing control unit 404 selects an amplification factor and an offset required for applying the second settings for range 3, and sets these to the high-accuracy position detection circuit 4021B. Subsequently, the flow advances to step S505.

In step S505, the position signal processing control unit 404 waits for the output of the high-accuracy position detection circuit 4021B to stabilize. After the output of the high-accuracy position detection circuit 4021 has stabilized, the flow advances to step S506.

In step S506, the position signal processing control unit 404 obtains a current position signal output from the high-accuracy position signal processing unit 402B. In step S507, the position signal processing control unit 404 obtains a current position signal output from the whole-range position signal processing unit 402A. In step S508, the position signal processing control circuit 404 generates a correction value to be used in the position signal correction unit 4024, based on the current position signals obtained by the high-accuracy position signal processing unit 402B and the whole-range position signal processing unit 402A, and supplies the generated correction value to a position signal correction unit 4024B. The correction value is, for example, a difference value between the current position signal obtained by the high-accuracy position signal processing unit 402B and the current position signal obtained by the whole-range position signal processing unit 402A.

In step S509, the position signal processing control unit 404 controls the position signal selecting unit 416 in such a manner that a current position signal output from the high-accuracy position signal processing unit 402B is supplied to the subtractor 406. As a result, feedback control is performed based on the output of the high-accuracy position signal processing unit 402B and in accordance with the second settings.

In step S510, the control circuit 212 resumes the photographing operation. The photographing operation will be described later. At the end of the photographing operation, the flow advances to step S511.

In step S511, the position signal processing control unit 404 controls the position signal selecting unit 416 in such a manner that a current position signal output from the whole-range position signal processing unit 402A is supplied to the subtractor 406. In the next operation, feedback control is performed based on the output of the whole-range position signal processing unit 402A. For this reason, position detection can be performed no matter where the stroke position of the movable portion 303 is in the movable range.

In step S512, the position signal processing control unit 404 clears the settings from the position signal correction unit 4024B.

Figure 22:
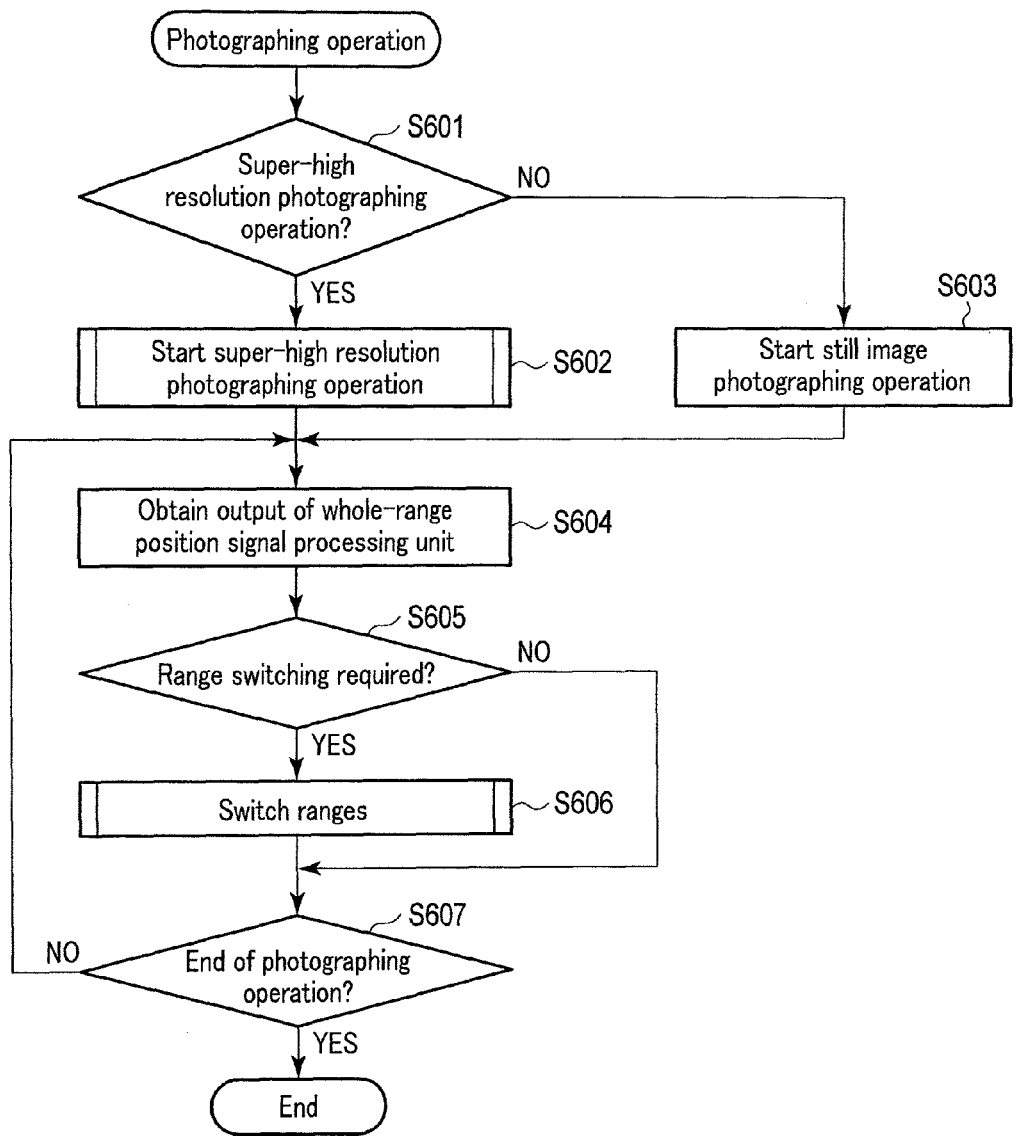
FIG. 22 is a flowchart illustrating a photographing operation according to the second embodiment.

FIG. 22 is a flowchart illustrating a photographing operation. In step S601, the control circuit 212 determines whether an instruction for starting a super-high resolution photographing operation is entered at the present time. If it is determined in step S601 that the instruction for starting the super-high resolution photographing operation is entered, the control flow advances to step S602. If it is determined in step S601 that the instruction for starting super-high resolution photographing operation is not entered and that an instruction for starting still image photographing operation is entered, then the control flow advances to step S603.

In step S602, the control circuit 212 starts the super-high resolution photographing operation. In step S603, the control circuit 212 starts a still image photographing operation. The super-high resolution photographing operation and the still image photographing operation are similar to those described in connection with the first embodiment, and reference to them will be omitted.

After the photographing operation is started in step S602 or S603, the control flow advances to step S604 without waiting for the photographing operation to end. In step S604, the position signal processing control unit 404 obtains a current position signal output from the whole-range position signal processing unit 402A.

In step S605, the position signal processing control unit 404 determines whether or not range switching is required. If it is determined in step S605 that the range switching is required, the control flow advances to step S606. If it is not determined in step S605 that the range switching is required, the control flow returns to step S604 until it is determined in step S607 that the photographing operation has ended.

In step S605, the position signal processing control unit 404 switches ranges. A description will be given of the range switching processing with reference to FIG. 23.

In step S701, the position signal processing control unit 404 controls the position signal selecting unit 416 in such a manner that a current position signal output from the whole-range position signal processing unit 402A is supplied to the subtractor 406.

In step S702, the position signal processing control unit 404 determines in which range (range 1, range 2 or range 3) the current movable portion 303 is located, based on the current position signal output from the whole-range position signal processing unit 402A. If it is determined in step S702 that the current movable portion 303 is located in range 1, the control flow advances to step S703. If it is determined in step S702 that the current movable portion 303 is located in range 2, the control flow advances to step S704. If it is determined in step S702 that the current movable portion 303 is located in range 3, the control flow advances to step S705.

In step S703, the position signal processing control unit 404 applies the second settings for range 1. Subsequently, the flow advances to step S706. In step S704, the position signal processing control unit 404 applies the second settings for range 2. Subsequently, the flow advances to step S706. In step S704, the position signal processing control unit 404 applies the second settings for range 3. Subsequently, the flow advances to step S706.

In step S706, the position signal processing control unit 404 waits for the output of the high-accuracy position detection circuit 4021B to stabilize. After the output of the high-accuracy position detection circuit 4021B has stabilized, the flow advances to step S707.

In step S707, the position signal processing control unit 404 obtains a current position signal output from the high-accuracy position signal processing unit 402B. In step S708, the position signal processing control unit 404 obtains a current position signal output from the whole-range position signal processing unit 402A. In step S709, the position signal processing control circuit 404 generates a correction value to be used in the position signal correction unit 4024, based on the current position signals obtained by the high-accuracy position signal processing unit 402B and the whole-range position signal processing unit 402A, and supplies the generated correction value to the position signal correction unit 4024B.

Figure 23:
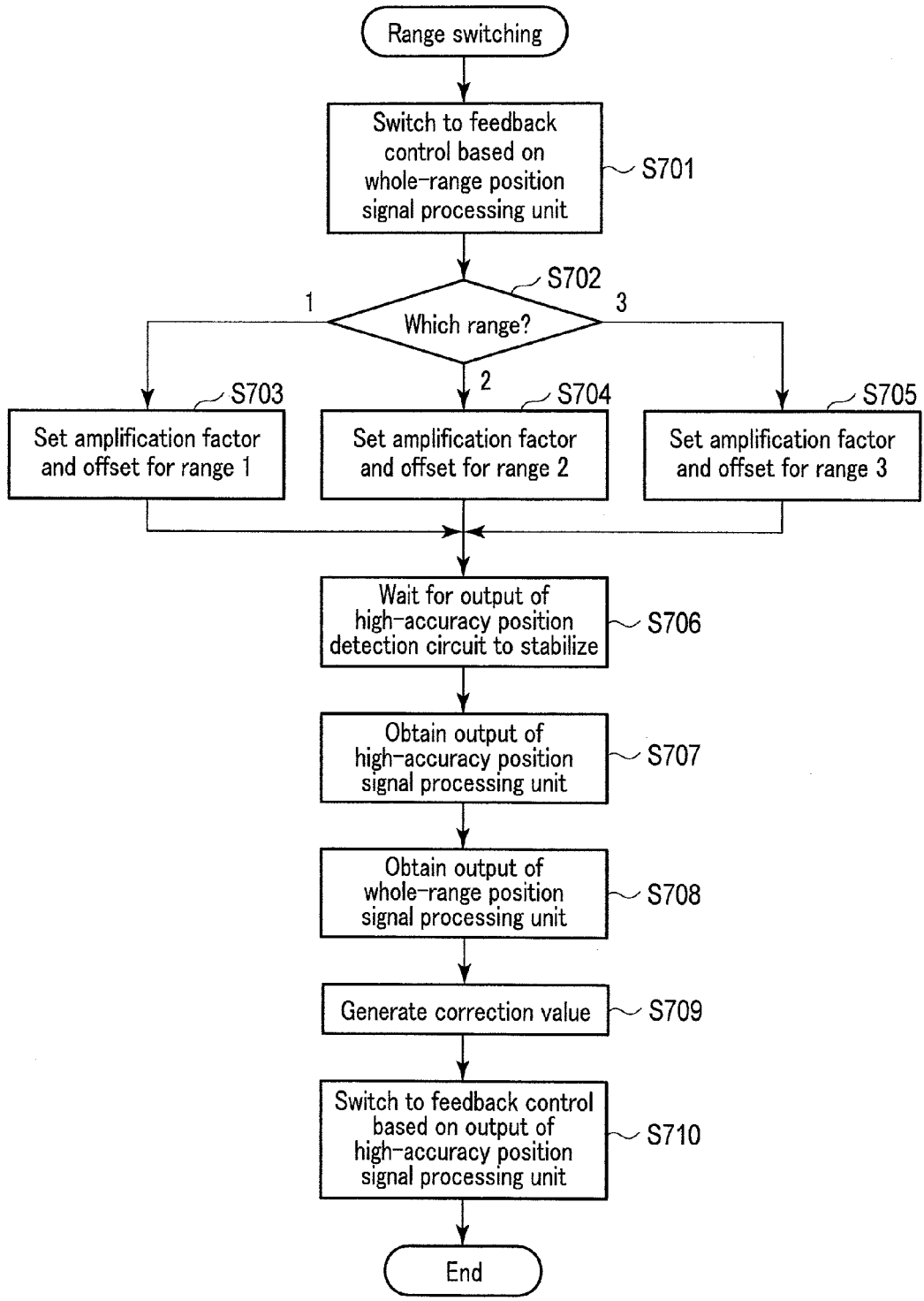
FIG. 23 is a flowchart illustrating range switching processing according to the second embodiment.

In step S710, the position signal processing control unit 404 controls the position signal selecting unit 416 in such a manner that a current position signal output from the high-accuracy position signal processing unit 402B is supplied to the subtractor 406. Then, the processing in FIG. 23 is brought to an end.

Reference will be made back to FIG. 22. After the end of step S606, the control flow returns to step S604 until it is determined in step S607 that the photographing operation has ended.

As described above, according to the present embodiment, high-accuracy position detection can be made in the whole range of the stroke of the movable portion 303, as in the first embodiment. In addition, since the position signal processing unit for the first settings and the position signal processing unit for the second settings are provided independently, feedback control does not have to be performed at the time of switching between the first settings and the second settings.

The present invention has been described based on the embodiments, but the present invention is in no way limited to those embodiments. Needless to say, the present invention can be modified in various manners, without departing from the spirit and scope of the invention. For example, the above-mentioned configuration of the image stabilization unit 205 is an example and can be modified, as needed. For example, the VCM may have a different configuration. In connection with the above embodiments, the fixed portions were described as comprising position detection magnets, and the movable portion was described as comprising Hall sensors. Instead of this structure, the movable portion may be provided with position detection magnets, and the fixed portions may be provided with Hall sensors. In addition, the image stabilization unit 206 may be configured to move the optical system 102, not the imaging element. Furthermore, in the above-mentioned embodiments, the second settings are applied when a super-high resolution photographing operation and a still image photographing operation are performed. However, the second settings may be applied only when the super-high resolution photographing operation requiring especially high-accuracy position control is performed.

The operations described in relation to the above embodiments may be stored in the form of programs executable by a CPU (which is a computer) or the like. The programs can be stored in storage mediums of external storage devices, such as a memory card, a magnetic disk, an optical disk or a semiconductor memory, and distributed. The CPU or the like reads the programs from a storage medium of an external storage device, and the operations can be executed and controlled based on the read programs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
an image stabilizing unit including (i) a movable portion provided with an imaging element or a photographing lens, (ii) a motor which drives the movable portion relative to a fixed portion, and (iii) a position detector which detects a position of the movable portion;
a position signal processing unit which converts an analog signal output from the position detector into position information which is based on a movement amount of the movable portion; and
a position signal processing control unit which applies first settings or second settings to the position signal processing unit, wherein the first settings enable the analog signal output from the position detector to be detected as a position in a whole movable range of the movable portion, and the second settings enable the analog signal output to be detected as a position in divided ranges obtained by dividing the whole movable range of the movable portion,
wherein the position signal processing control unit applies the second settings based on an output obtained when the position signal processing unit is applied with the first settings.

2. The imaging apparatus according to claim 1, wherein the second settings are determined such a manner that the divided ranges obtained by dividing the whole movable range of the movable portion have an equal position detection resolution.

3. The imaging apparatus according to claim 1, wherein the position signal processing unit comprises:
a position detection circuit including (i) an amplifier unit which amplifies the analog signal output supplied from the position detection unit and (ii) an offset correction unit which provides an offset for the analog signal output;
an AD converter which converts the analog signal output supplied from the position detecting circuit into a digital signal;
a position calculation unit which converts an output of the AD converter into position information; and
a position signal correction unit which causes an output of the position calculation unit applied with the first settings and an output of the position calculation unit applied with the second settings to become equal to each other,
wherein the position signal processing control unit determines an amplification factor of the amplifier unit, an offset provided by the offset correction unit and a correction value of the output of the position calculation unit, based on a predetermined timing.

4. The imaging apparatus according to claim 3, wherein the predetermined timing is a start timing of a still image photographing operation.

5. The imaging apparatus according to claim 3, wherein the predetermined timing is a start timing of a pixel-shift super-high resolution photographing operation.

6. An imaging apparatus comprising:
- an image stabilizing unit including (i) a movable portion provided with an imaging element or a photographing lens, (ii) a motor which drives the movable portion relative to a fixed portion, and (iii) a position detector which detects a position of the movable portion;
- a first position signal processing unit which converts an analog signal output from the position detector into position information which is based on a movement amount by which the movable portion moves in a whole movable range of the movable portion;
- a second position signal processing unit which changes an analog signal output from the position detector into position information which is obtained with respect to divided ranges obtained by dividing the whole movable range of the movable portion and which is more accurate than the position information provided by the first position signal processing unit;
- a position signal processing control unit which applies the second position signal processing unit with settings that enable the analog signal output from the position detector to be detected as a position in each of the divided ranges obtained by dividing the whole movable range of the movable portion; and
- a position signal processing selecting unit which selects either the first position signal processing unit or the second position signal processing unit,
- wherein the position signal processing control unit determines settings applied by the second position signal processing unit based on information provided by the first position signal processing unit.

7. The imaging apparatus according to claim 6, wherein the second position signal processing unit determines settings such that the divided ranges obtained by dividing the whole movable range of the movable portion have an equal position detection resolution.

8. The imaging apparatus according to claim 6, wherein the second position signal processing unit comprises:
- a position detection circuit including (i) an amplifier unit which amplifies the analog signal output supplied from the position detection unit at an amplification factor larger than that used by the first position signal processing unit and (ii) an offset correction unit which provides an offset for the analog signal output;
- an AD converter which converts the analog signal output supplied from the position detecting circuit into a digital signal;
- a position calculation unit which converts an output of the AD converter into position information; and
- a position signal correction unit which causes an output of the first position signal processing unit and an output of the second position signal processing unit to become equal to each other,
- wherein the position signal processing control unit determines an amplification factor, the offset and a correction value provided by the position signal correction unit, based on a predetermined timing, and causes the position signal processing selecting unit to select an output of the second position signal processing unit.

9. The imaging apparatus according to claim 8, wherein the predetermined timing is a start timing of a still image photographing operation.

10. The imaging apparatus according to claim 8, wherein the predetermined timing is a start timing of a pixel-shift super-high resolution photographing operation.

* * * * *